United States Patent
Han et al.

(10) Patent No.: US 10,275,684 B2
(45) Date of Patent: Apr. 30, 2019

(54) AUTHENTICATION METHOD AND APPARATUS, AND METHOD AND APPARATUS FOR TRAINING A RECOGNIZER

(71) Applicant: Samsung Electronics Co., Ltd., Suwon-si, Gyeonggi-do (KR)

(72) Inventors: Seungju Han, Seoul (KR); Byungin Yoo, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 30 days.

(21) Appl. No.: 15/296,503

(22) Filed: Oct. 18, 2016

(65) Prior Publication Data
US 2017/0124428 A1     May 4, 2017

(30) Foreign Application Priority Data

Nov. 4, 2015    (KR) .................. 10-2015-0154553
Jul. 5, 2016     (KR) .................. 10-2016-0084878

(51) Int. Cl.
| | | |
|---|---|---|
| *G06K 9/62* | (2006.01) | |
| *G06F 21/32* | (2013.01) | |
| *G06K 9/46* | (2006.01) | |
| *G06N 99/00* | (2019.01) | |
| *G06K 9/00* | (2006.01) | |

(52) U.S. Cl.
CPC .......... *G06K 9/6227* (2013.01); *G06F 21/32* (2013.01); *G06K 9/00288* (2013.01); *G06K 9/4628* (2013.01); *G06K 9/4671* (2013.01); *G06K 9/6215* (2013.01); *G06N 99/005* (2013.01)

(58) Field of Classification Search
USPC ........... 348/E7.081, 142, 169; 382/103, 117, 382/157, 224; 600/408; 706/20
See application file for complete search history.

(56) References Cited

U.S. PATENT DOCUMENTS 7,099,510 B2 *   8/2006   Jones ................ G06K 9/00248
                                                               348/142
7,184,602 B2 *   2/2007   Cohen ............... G06K 9/00248
                                                            348/E7.081

(Continued)

FOREIGN PATENT DOCUMENTS

| JP | 2007109229 A | 4/2007 |
|---|---|---|
| JP | 2011165204 A | 8/2011 |

(Continued)

OTHER PUBLICATIONS

Hu Junlin et al.: "Discriminative Deep Metric Learning for Face Verification in the Wild", IEEE Conference on Computer Visision and Pattern Recognition, pp. 1875-1882, Jun. 23, 2014.

(Continued)

*Primary Examiner* — Xuemei G Chen
(74) *Attorney, Agent, or Firm* — Harness, Dickey & Pierce, P.L.C.

(57) ABSTRACT

An authentication method and apparatus, and a method and apparatus for training a recognizer are provided. The authentication method may include determining whether authentication of an input image succeeds by comparing a similarity associated with an intermediate layer to a threshold.

35 Claims, 22 Drawing Sheets

(56) References Cited

U.S. PATENT DOCUMENTS

| | | | | |
|---|---|---|---|---|
| 7,831,074 | B2* | 11/2010 | Zhou | G06K 9/6257 |
| | | | | 348/169 |
| 7,962,428 | B2* | 6/2011 | Bi | G06F 19/321 |
| | | | | 706/20 |
| 8,369,595 | B1* | 2/2013 | Derakhshani | G06K 9/0061 |
| | | | | 382/117 |
| 8,447,139 | B2* | 5/2013 | Guan | G06K 9/6257 |
| | | | | 382/224 |
| 8,559,722 | B2* | 10/2013 | Tsuji | G06K 9/00288 |
| | | | | 382/103 |
| 9,141,855 | B2* | 9/2015 | Xu | G06K 9/0055 |
| 9,576,214 | B1* | 2/2017 | Zhang | G06K 9/4614 |
| 9,589,181 | B2* | 3/2017 | Ito | G06K 9/00288 |
| 9,875,391 | B2* | 1/2018 | Liang | G06K 9/00255 |
| 9,978,013 | B2* | 5/2018 | Kaufhold | G01S 7/417 |
| 2002/0076088 | A1 | 6/2002 | Tsai | |
| 2006/0271525 | A1* | 11/2006 | Sukegawa | G06K 9/00288 |
| 2010/0074479 | A1 | 3/2010 | Chou et al. | |
| 2014/0169688 | A1* | 6/2014 | Dollar | G06K 9/6257 |
| | | | | 382/224 |
| 2015/0125049 | A1 | 5/2015 | Taigman et al. | |
| 2015/0128291 | A1 | 5/2015 | Hyodo et al. | |
| 2015/0213302 | A1* | 7/2015 | Madabhushi | G06K 9/00147 |
| | | | | 382/133 |
| 2015/0324629 | A1* | 11/2015 | Kim | G06K 9/00228 |
| | | | | 382/203 |
| 2015/0347820 | A1* | 12/2015 | Yin | G06K 9/00221 |
| | | | | 382/118 |
| 2016/0125572 | A1* | 5/2016 | Yoo | G06T 5/002 |
| | | | | 382/157 |
| 2016/0148079 | A1* | 5/2016 | Shen | G06K 9/4628 |
| | | | | 382/157 |
| 2016/0148080 | A1* | 5/2016 | Yoo | G06K 9/4628 |
| | | | | 382/157 |
| 2016/0171346 | A1* | 6/2016 | Han | G06K 9/66 |
| | | | | 382/103 |
| 2016/0174902 | A1* | 6/2016 | Georgescu | G06T 7/73 |
| | | | | 600/408 |
| 2016/0275342 | A1* | 9/2016 | Silva | G06K 9/6209 |
| 2016/0275415 | A1* | 9/2016 | Yoo | G06N 99/005 |
| 2016/0379041 | A1* | 12/2016 | Rhee | G06K 9/00208 |
| | | | | 382/118 |
| 2017/0076224 | A1* | 3/2017 | Munawar | G06N 99/005 |

FOREIGN PATENT DOCUMENTS

| | | |
|---|---|---|
| KR | 101070442 B1 | 10/2011 |
| KR | 101074953 B1 | 10/2011 |
| KR | 20120069922 A | 6/2012 |

OTHER PUBLICATIONS

Yi Sun et al.: "Hybrid Deep Learning for Face Verification", IEEE International Conference on Computer Vision, pp. 1489-1496, Oct. 17, 2013.

Yi Sun et al.: "Deep Learning Face Representation by Joint Identification-Verification," Jun. 18, 2014.

Schroff Florian et al.: "FaceNet: A unified embedding for face recognition and clustering," IEEE Conference on Computer Vision and Pattern Recognition, pp. 815-823, Jun. 7, 2015.

Extended European Search Report dated Mar. 20, 2017.

* cited by examiner

AUTHENTICATION METHOD AND APPARATUS, AND METHOD AND APPARATUS FOR TRAINING A RECOGNIZER

CROSS-REFERENCE TO RELATED APPLICATIONS

This application claims priority under 35 U.S.C. § 119 to Korean Patent Application No. 10-2015-0154553, filed on Nov. 4, 2015, and Korean Patent Application No. 10-2016-0084878, filed on Jul. 5, 2016, in the Korean Intellectual Property Office, the entire contents of each of which are incorporated herein by reference in its entirety.

BACKGROUND

1. Field

At least one example embodiment relates to an authentication method and apparatus, and/or a method and apparatus for training a recognizer.

2. Description of the Related Art

Recently, various schemes, for example, face recognition or fingerprint recognition, have been used to perform user authentication. A recognizer used for user authentication may have a similar structure to a neural network of a human. When complexity of an internal structure of the recognizer increases, an output of the recognizer may be delayed despite an increase in a recognition performance. For example, when a number of layers included in the recognizer increases, the output of the recognizer may be delayed.

SUMMARY

Some example embodiments relate to an authentication method.

In some example embodiments, the authentication method may include applying an input image to a recognizer, the recognizer including a plurality of layers, and performing authentication of the input image based on at least one feature value of the input image and at least one feature value of a registered image corresponding to the at least one intermediate layer, the at least one feature value of the input image output by at least one intermediate layer of the layers in the recognizer.

The performing may include determining whether the input image is accepted or rejected. The plurality of layers may be layers of a deep learning (DL) network. The plurality of layers may include at least one convolution layer and at least one pooling layer. The intermediate layer may include at least one of layers other than a final layer among the plurality of layers.

The at least one intermediate layer is a plurality of intermediate layers. The performing may include determining whether the authentication of the input image succeeds based on feature values of the input image and feature values of the registered image, the feature values of the input image output by the intermediate layers, respectively, and the feature values of the registered image corresponding to each of the intermediate layers, respectively.

The authentication method may further include determining whether the authentication of the input image succeeds, based on a feature value of the input image output by a final layer in the recognizer and a feature value of the registered image corresponding to the final layer.

The performing may include determining a similarity between the at least one feature value of the input image and the at least one feature value of the registered image; and performing the authentication based on the similarity to a threshold.

The performing include, determining that the input image is accepted when the determined similarity exceeds a similarity corresponding to a false acceptance rate (FAR) of the intermediate layer. The performing include, determining that the input image is rejected when the determined similarity is less than a similarity corresponding to a verification rate (VR) of the intermediate layer. The performing include, proceeding to a next layer. Of the recognizer when the determined similarity exceeds the similarity corresponding to the VR and is less than the similarity corresponding to the FAR The threshold may include a first threshold part based on a false acceptance rate (FAR) and a second threshold part based on a verification rate (VR). The first threshold part may be greater than the second threshold part.

The performing may include determining a distance between the at least one feature value of the input image and the at least one feature value of the registered image; and performing the authentication based on the distance threshold.

The performing may include, determining that the input image is accepted when the determined distance is less than a distance corresponding to a false acceptance rate (FAR) of the intermediate layer. The performing may include, determining that the input image is to be rejected when the determined distance exceeds a distance corresponding to a verification rate (VR) of the intermediate layer. The performing may further include, proceeding to a next layer of the recognizer when the determined distance exceeds the distance corresponding to the FAR and is less than the distance corresponding to the VR.

The threshold may include a first threshold part based on a false acceptance rate (FAR) and a second threshold part based on a verification rate (VR). The first threshold part may be greater than the second threshold part.

The authentication method may further include applying the registered image to the recognizer, and storing at least one the feature value output by the at least one intermediate layer and a final layer feature value output by a final layer as feature values of the registered image. The authentication method may further include receiving the registered image from a camera.

Other example embodiments relate to a training method.

In some example embodiments, the training method may include training a recognizer, the recognizer including a plurality of layers, determining a first threshold for an intermediate layer in the trained recognizer based on a desired performance index, and determining a second threshold for a final layer in the trained recognizer based on the desired performance index.

The training method may further include applying validation data to the trained recognizer, determining a first similarity between intermediate feature values, the intermediate feature values output by the intermediate layer, determining a second similarity between final feature values, the final feature values output by the final layer, determining the first threshold based on the first similarity, and determining the second threshold based on the second similarity.

The training method may further include applying validation data to the trained recognizer, determining a first distance between intermediate feature values, the intermediate feature values output by the intermediate layer, determining a second distance between final feature values, the final feature values output by the final layer, determining the first threshold based on the first distance, and determining the second threshold based on the second distance.

The first threshold and the second threshold may be used to determine whether an input image is to be accepted or rejected.

The determining of the first threshold may include determining the first threshold based on a similarity between a first intermediate feature value of the intermediate feature values and a second intermediate feature value of the intermediate feature values.

The determining of the first threshold may include determining the first threshold based on a distance between a first intermediate feature value of the intermediate feature values and a second intermediate feature value of the intermediate feature values.

The training of the recognizer may include training the recognizer based on an output of the intermediate layer, an output of the final layer and a label value of the training sample, the output of the intermediate layer in response to an input of a training sample, the output of the final layer in response to the input of the training sample.

The training of the recognizer may include training the recognizer based on an intermediate feature value output by a first network, a final value and a label of a training sample, the first network receives an output of the intermediate layer, the final feature value output by a second network that receives an output of the final layer.

Other example embodiments relate to an authentication apparatus.

In some example embodiments, the authentication apparatus may include at least one processor configured to execute computer-readable instructions to, output at least one intermediate feature value of an input image using at least one intermediate layer among a plurality of layers included in a recognizer, and perform authentication of the input image based on the at least one intermediate feature value of the input image and a feature value of a registered image corresponding to the intermediate layer.

The plurality of layers may be layers of a DL network. The at least one intermediate layer may include at least one layer other than a final layer among the plurality of layers.

The at least one intermediate layer is a plurality of intermediate layers. The at least one processor is further configured to execute the computer-readable instructions to determine whether the authentication of the input image succeeds based on intermediate feature values of the input image and feature values of the registered image, the feature values of the input image output by the intermediate layers, respectively, and the feature values of the registered image corresponding to the intermediate layers, respectively.

The authentication processor may be further configured to determine whether the input image is to be accepted or rejected.

The at least one processor may be further configured to execute the computer-readable instructions to determine a similarity between the at least one feature value of the input image and the at least one feature value of the registered image; and performing the authentication based on the similarity to a threshold.

The at least one processor may be further configured to execute the computer-readable instructions to determine a distance between the at least one feature value of the input image and the at least one feature value of the registered image; and performing the authentication based on the distance threshold.

The at least one processor may be further configured to execute the computer-readable instructions to apply the registered image to the recognizer and to store the at least one feature value output by the at least one intermediate layer and a final layer feature value output by a final layer as feature values of the registered image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
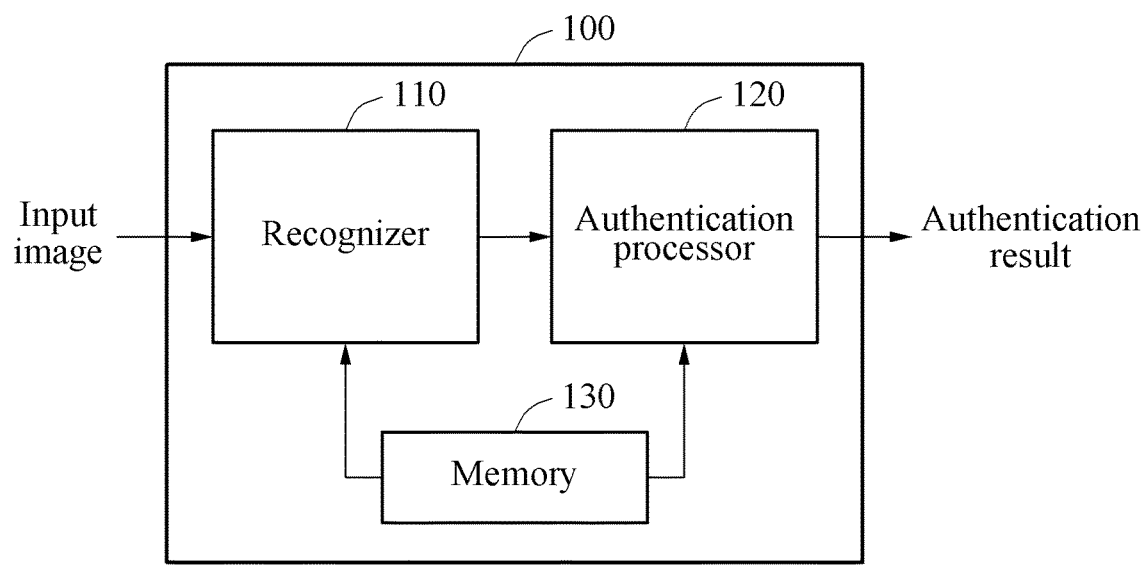
FIG. 1 is a block diagram illustrating an authentication apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are may be encoded on some form of non-transitory computer-readable storage medium.

In the following description, example embodiments may be used for a user interface, for example, user authentication using a camera.

FIG. 1 is a block diagram illustrating an authentication apparatus 100 according to at least one example embodiment. Referring to FIG. 1, the authentication apparatus 100 may include a recognizer 110, an authentication processor 120 and a memory 130. Each of the recognizer 110 and the authentication processor 120 may be implemented as at least one hardware module or combination of hardware and software.

Each of the recognizer 110 and the authentication processor 120 may be implemented in hardware, a processor configured to execute software, firmware, or any combination thereof, for example. When at least one of the recognizer 110 and the authentication processor 120 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the recognizer 110 and the authentication processor 120. CPUs, DSPs, ASICs and FPGAs may generally be referred to as processing devices.

In the event where at least one of the recognizer 110 and the authentication processor 120 is a processor executing software, the processor is configured as a special purpose machine to execute the software, stored in a storage medium (e.g., a memory 130), to perform the functions of the at least one of the recognizer 110 and the authentication processor 120. In such an embodiment, the processor may include one or more Central Processing Units (CPUs), digital signal processors (DSPs), application-specific-integrated-circuits (ASIC s), field programmable gate arrays (FPGAs) computers.

The recognizer 110 may receive an input image (for example, a fingerprint image or a face image of a user) and may output a feature value corresponding to the input image. The recognizer 110 may include a plurality of layers to extract feature values from the input image. The plurality of layers may be layers of a deep learning (DL) network. The input image may be received from, for example, a camera, a communicator or a memory.

The authentication processor 120 may output an authentication result based on a feature value output by the recognizer 110. For example, the authentication processor 120 may determine whether a face of the input image is a face of a registered user based on the feature value output by the recognizer 110, and may output an authentication result based on a determination result. The authentication result may be information indicating whether the input image is matched to a registered image, and may include, for example, an acceptance indicating a success in authentication or a rejection indicating a failure in authentication. For example, the authentication result may be transferred to an encryption application and may be used for an online payment or unlocking of a terminal.

The authentication apparatus 100 may perform early authentication of the input image, which will be further described below. The early authentication may be performed based on a feature value output by a first or intermediate layer among the plurality of layers included in the recognizer 110. The early authentication may include an early acceptance or early rejection. The first and intermediate layer may include, for example, layers other than a final layer among the plurality of layers. For the purposes of brevity, "intermediate layer" may refer to a layer other than the final layer of the plurality of layers. Thus, the final layer may be used for authentication when early authentication in a final intermediate layer fails.

By using the early authentication, an authentication speed may increase. For example, in the recognizer 110 including the plurality of layers, an output value of an intermediate layer may be generated and may be used for early authentication. By using the output value of the intermediate layer, the authentication speed may be enhanced in comparison to using the output value of the final layer. In some example embodiments, intermediate layers may be used for early authentication until the early authentication is successful or a final layer is reached. In other example embodiments, a designated number of intermediate layers may be used for early authentication (e.g., odd or even layers). The designated layers may be based on a training process and/or a structure of a network.

The recognizer 110 may be trained in advance based on a training sample. When the recognizer 110 is trained, a threshold for early authentication may be determined. A training process and a process of determining a threshold for early authentication will be further described below.

Figure 2:
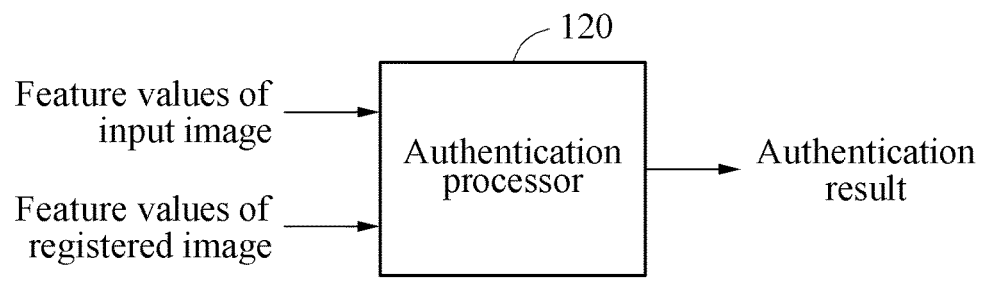
FIG. 2 is a block diagram illustrating an authentication processor according to at least one example embodiment.

FIG. 2 is a block diagram illustrating the authentication processor 120 of FIG. 1. Referring to FIG. 2, the authentication processor 120 may determine whether authentication of an input image succeeds based on a distance between the input image and a registered image. The registered image may refer to an image used as a criterion of authentication. For example, the authentication processor 120 may receive feature values of the input image and feature values of the registered image, and may calculate a distance between the feature values of the input image and the feature values of the registered image. In this example, when a similarity between the input image and the registered image increases, the distance may decrease. When the similarity between the input image and the registered image decreases, the distance may increase.

The authentication processor 120 may determine whether the authentication of the input image succeeds by comparing the calculated distance to a threshold, for example, a threshold distance, and may output an authentication result. In an example, when the calculated distance is less than the threshold distance, the authentication processor 120 may determine that the input image and the registered image are similar enough to authenticate a user and may output an acceptance indicating a success in the authentication. In another example, when the calculated distance is greater than the threshold distance, the authentication processor 120 may output a rejection indicating a failure in the authentication.

The feature values of the input image and feature values of the registered image are described prior to describing an early authentication operation. The authentication processor 120 may receive the feature values of the input image from the recognizer 110 of FIG. 1 and may receive the feature values of the registered image from a memory 130. While the memory 130 is illustrated as being separate, this is merely illustrative. The memory 130 may be located elsewhere, such as external to the authentication apparatus 100. The feature values of the registered image may be stored in advance in the storage during a registering operation. Depending on example embodiments, the feature values of the registered image may also be received from a recognizer. In this example, the feature values of the registered image may be extracted from the registered image in real time using the recognizer.

The feature values of the input image and the feature values of the registered image may be distinguished from each other based on layers of the recognizer 110. For example, when the recognizer 110 receives an input image, a feature value output by an intermediate layer in the recognizer 110 may be referred to as an intermediate feature value of the input image, and a feature value output by a final layer in the recognizer may be referred to as a final feature value of the input image. Similarly, when the recognizer 110 receives a registered image, a feature value output by the intermediate layer may be referred to as an intermediate feature value of the registered image, and a feature value output by the final layer may be referred to as a final feature value of the registered image. Also, a distance corresponding to the intermediate layer may be referred to as an intermediate distance, and a distance corresponding to the final layer may be referred to as a final distance. For example, the intermediate distance may be determined based on the intermediate feature value of the input image and the intermediate feature value of the registered image, and the final distance may be determined based on the final feature value of the input image and the final feature value of the registered image. The intermediate distance may be used for early authentication without having to output a feature value output by the final layer.

A threshold used for the authentication of the input image may be determined based on a desired (or alternatively, predetermined) performance index. The performance index may include an index associated with a false acceptance rate (FAR) and an index associated with a verification rate (VR). The FAR may be a probability that an object of an input image is incorrectly recognized to be the same as an object of the registered image even though the objects are different from each other. The VR may be a probability that the object of the input image is correctly recognized to be the same as the object of the registered image when the objects are the same. In an example, when a threshold (for example, a threshold distance) is determined based on the FAR, the authentication processor 120 may determine whether a distance between the input image and the registered image is less than the threshold distance and may accept the input image. In another example, when the threshold is determined based on the VR, the authentication processor 120 may determine whether the distance between the input image and the registered image exceeds the threshold distance and may reject the input image.

Thresholds may be determined for each of a plurality of layers in the recognizer 110. Each of the plurality of layers may have a threshold used to determine whether authentication of an input image succeeds. For example, an intermediate threshold (for example, an intermediate threshold distance) for the intermediate layer, and a final threshold (for example, a final threshold distance) for the final layer may be determined. The authentication processor 120 may determine whether the authentication of the input image succeeds, based on the intermediate distance and the intermediate threshold distance. For example, the authentication processor 120 may compare the intermediate distance to the intermediate threshold distance, to determine whether the authentication of the input image succeeds. As described above, the intermediate distance may be used for early authentication to determine an early acceptance or early rejection of the input image. Hereinafter, performance indices of the intermediate layer may be referred to as "FAR1" and "VR1," and performance indices of the final layer may be referred to as "FAR2" and "VR2." The FAR1 and FAR2 may be independently determined. Also, the VR1 and VR2 may be independently determined.

In an example, a threshold determined based on the performance index FAR1 may be determined as a distance corresponding to the performance index FAR1 and may be used for early acceptance. For example, when the intermediate distance is less than the distance corresponding to the performance index FAR1, the authentication processor 120 may determine that the input image is to be early accepted. Also, a threshold determined based on the performance index VR1 may be determined as a distance corresponding to the performance index VR1 and may be used for early rejection. For example, when intermediate distance exceeds the distance corresponding to the performance index VR1, the authentication processor 120 may determine that the input image is to be early rejected. When the input image satisfies the above condition for early authentication, the input image may not need to be further processed and an authentication process may be terminated. Thus, an authentication speed may increase.

When the early authentication fails, the authentication processor 120 may continue to perform the authentication. For example, when the intermediate distance exceeds the distance corresponding to the FAR1 and is less than the distance corresponding to the VR1, the authentication processor 120 may fail in the early authentication. In this example, the authentication processor 120 may perform the authentication of the input image based on the final distance if early authentication in the intermediate layers failed. The authentication processor 120 may compare the final distance to the final threshold distance, to determine whether the authentication of the input image succeeds. In an example, when the final distance is less than a distance corresponding to the performance index FAR2, the authentication processor 120 may determine to accept the input image. In another example, when the final distance exceeds a distance corresponding to the performance index VR2, the authentication processor 120 may determine to reject the input image.

When the authentication based on the final distance fails, the authentication may be performed based on a political determination (i.e., standards and/or procedures set forth by an entity implementing the authentication). For example, due to a failure in the authentication, the authentication may be terminated, an authentication may be performed based on a new input image, or the authentication may be re-performed based on the input image.

Figure 3:
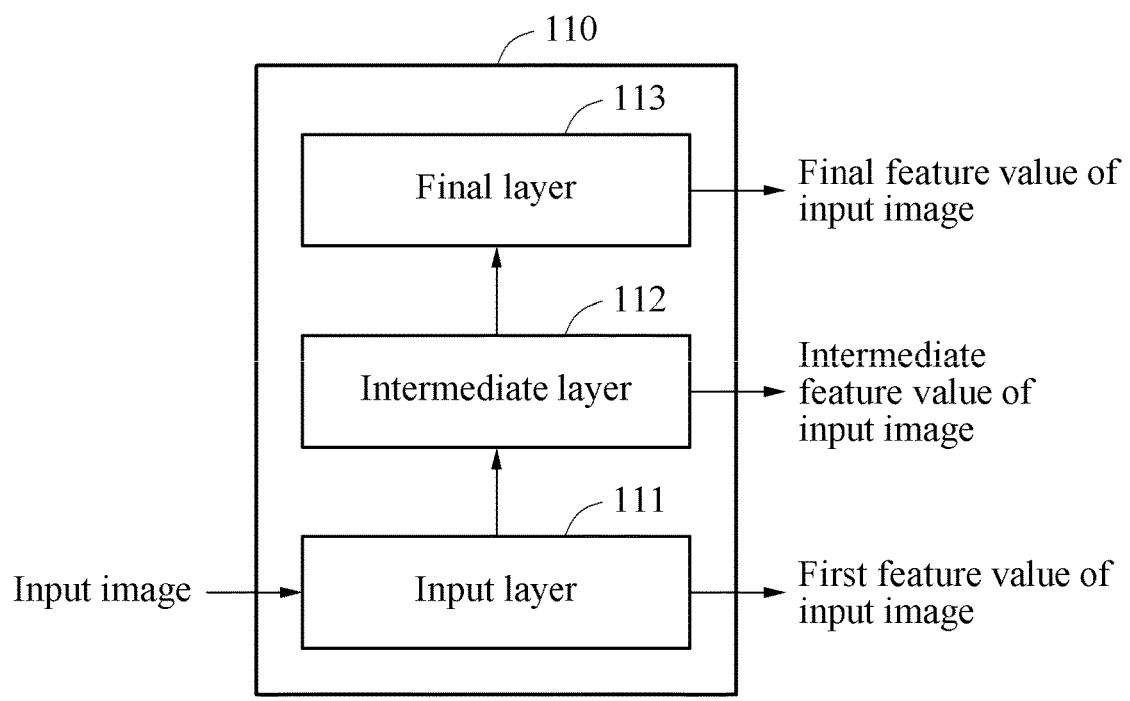
FIG. 3 is a block diagram illustrating a recognizer including a plurality of layers according to at least one example embodiment.

FIG. 3 is a block diagram illustrating a recognizer 110 including a plurality of layers according to at least one example embodiment. Referring to FIG. 3, the recognizer 110 may include an input layer 111, an intermediate layer 112 and a final layer 113. The input layer 111, the intermediate layer 112 and the final layer 113 may be implemented as at least one hardware module or a combination of hardware and software such as a processing device executing computer-readable instructions stored in the memory 130. The input layer 111, the intermediate layer 112 and the final layer 113 may be trained in advance based on a training sample. A training process will be further described below.

The input layer 111 may receive an input image, may extract a feature value from the input image, and may transmit the extracted feature value to the intermediate layer 112. The intermediate layer 112 may extract and output an intermediate feature value of the input image based on the feature value received from the input layer 111. Although the intermediate layer 112 is represented by a single block in FIG. 3, the intermediate layer 112 may include a plurality of layers. The intermediate layer 112 may transmit the intermediate feature value of the input image to the final layer 113. The final layer 113 may extract and output a final feature value of the input image based on the intermediate feature value received from the intermediate layer 112 (i.e., the intermediate layer preceding the final layer).

While the final layer 113 is illustrated it should be understood that the final layer 113 and any intermediate layers subsequent to an early authentication success may or may not be implemented when early authentication is successful at the input layer 111 or one of the intermediate layers 112.

For convenience of description, the input layer 111 and the intermediate layer 112 are separately illustrated in FIG. 3, however, there is no limitation thereto. For example, the intermediate layer 112 may include the input layer 111. In this example, a feature value output by the input layer 111 may be used for early authentication.

Figure 4:
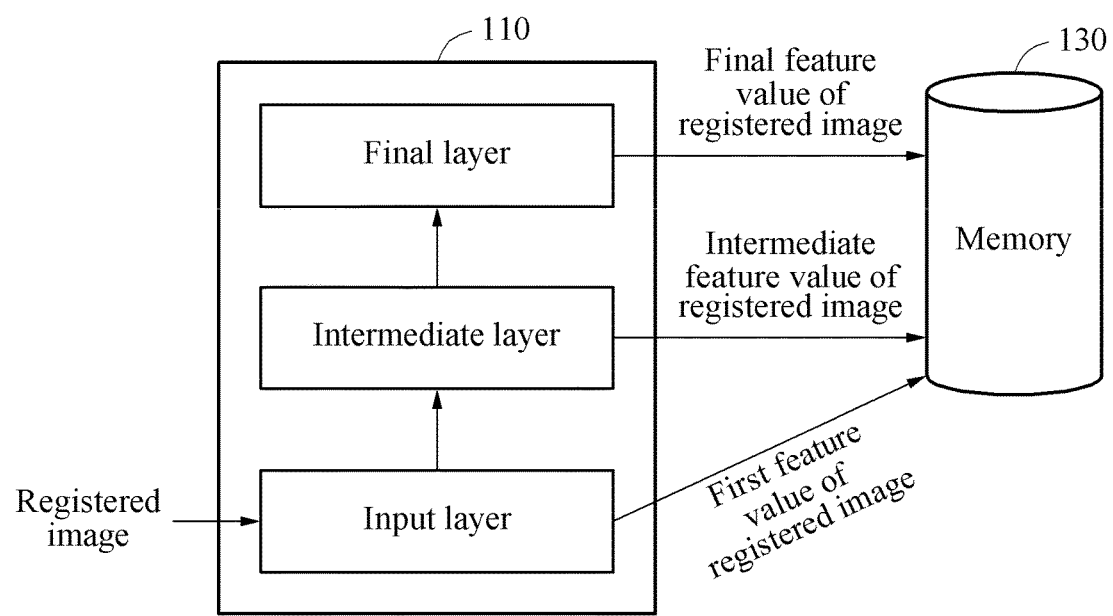
FIG. 4 is a block diagram illustrating a process of generating a feature value of a registered image according to at least one example embodiment.

FIG. 4 is a block diagram illustrating a process of generating a feature value of a registered image according to at least one example embodiment. Referring to FIG. 4, a recognizer 110 may output feature values of the registered image based on the registered image. The registered image may include, for example, a face image of a user for authentication, and may be received from, for example, a camera, a communicator or a memory. For example, the feature values of the registered image may be stored in the memory 130 in advance before an authentication process is performed.

As described above, the feature values of the registered image may be generated in association with a plurality of layers, similarly to feature values of an input image. For example, an intermediate feature value and a final feature value of the registered image may be generated by an intermediate layer and a final layer, respectively. The memory 130 may store the intermediate feature value of the registered image in association with the intermediate layer, and the final feature value of the registered image in association with the final layer. Also, the memory 130 may store an intermediate threshold corresponding to the intermediate layer, and a final threshold corresponding to the final layer. The memory 130 may store a threshold for each layer of the intermediate layer. In an example, the memory 130 may store feature values of the registered image, and may transmit the feature values of the registered image to the authentication processor 120 in response to authentication being performed. In another example, the feature values of the registered image may be extracted in real time and transmitted by the recognizer 110 to the authentication processor 130, instead of being stored in the memory 130 in advance. In this example, the memory 130 may store the registered image instead of the feature values of the registered image.

Figure 5:
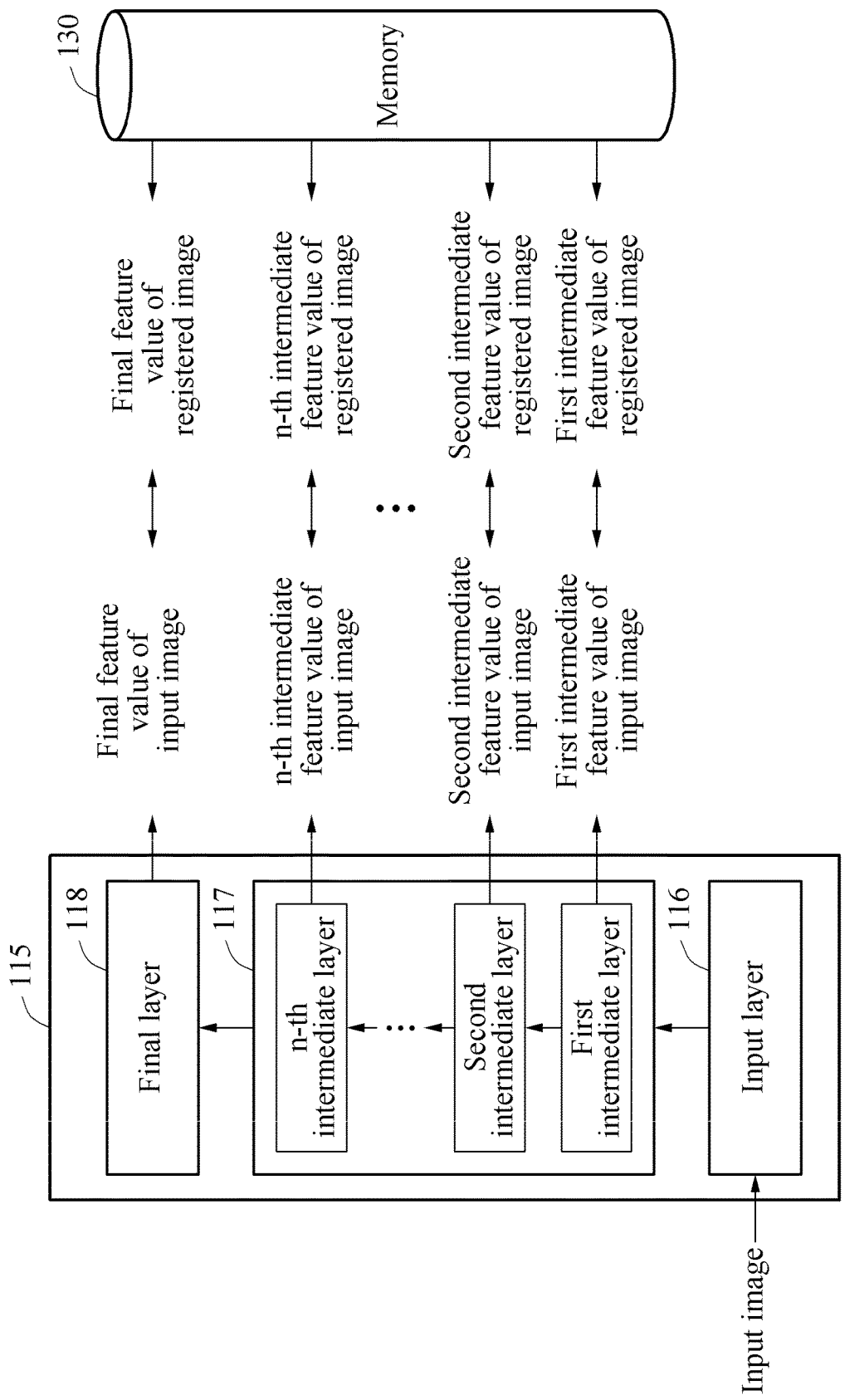
FIG. 5 is a diagram illustrating a plurality of intermediate layers according to at least one example embodiment.

FIG. 5 is a diagram illustrating a plurality of intermediate layers according to at least one example embodiment. Referring to FIG. 5, a recognizer 115 may include an input layer 116, an intermediate layer 117 and a final layer 118. The intermediate layer 117 may include a plurality of intermediate layers, for example, a first intermediate layer, a second intermediate layer and an n-th intermediate layer. While not illustrated in FIG. 5, in other example embodiments, the input layer 116 may output a feature value and be considered by of the intermediate layer.

The input layer 116 may extract a feature value from an input image and may transmit the extracted feature value to the intermediate layer 117. Each of the plurality of intermediate layers in the intermediate layer 117 may extract and output an intermediate feature value. For example, the first intermediate layer may extract and output a first intermediate feature value of the input image based on the feature value received from the input layer 116. The second intermediate layer may extract and output a second intermediate feature value of the input image based on the first intermediate feature value. The n-th intermediate layer may extract and output an n-th intermediate feature value of the input image based on an (n−1)-th intermediate feature value of the input layer. The final layer 118 may extract and output a final feature value of the input image based on the n-th intermediate feature value.

The memory 130 may store, in advance, feature values of a registered image corresponding to a plurality of layers of the recognizer 115. The feature values of the registered image may be generated in advance by the recognizer 115 and may be stored in the memory 130. For example, the memory 130 may store, in advance, a first intermediate feature value of the registered image corresponding to the first intermediate layer, a second intermediate feature value of the registered image corresponding to the second intermediate layer, an n-th intermediate feature value of the registered image corresponding to the n-th intermediate layer, and final feature values of the registered image corresponding to the final layer 118.

The feature values of the input image output from the intermediate layer 117 and the final layer 118 may be sequentially compared to the feature values of the registered image until early authentication or final authentication succeeds. Whether early authentication or final authentication succeeds may be determined based on distances between the feature values of the input image and the feature values of the registered image, respectively.

For convenience of description, the input layer 116 and the intermediate layer 117 are separately illustrated in FIG. 5, however, there is no limitation thereto. For example, the intermediate layer 117 may include the input layer 116. In this example, the input layer 116 may operate as the first intermediate layer.

Figure 6A:
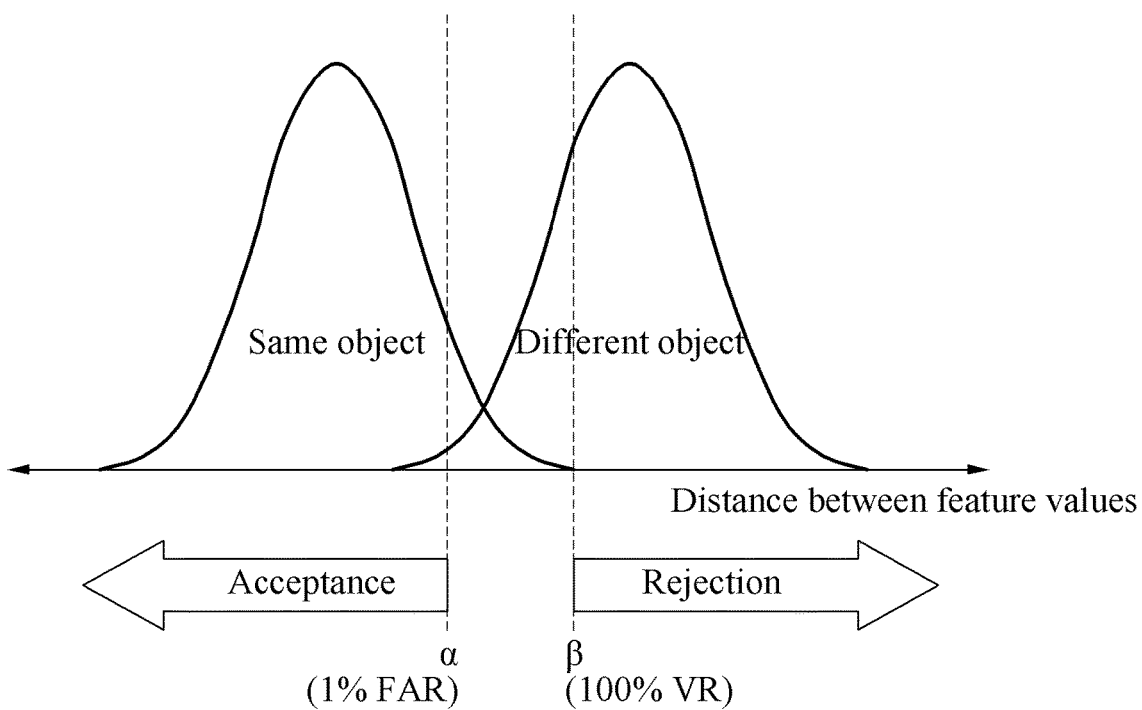
FIGS. 6A and 6B are diagrams illustrating thresholds based on performance indices according to at least one example embodiment.
Figure 6B:
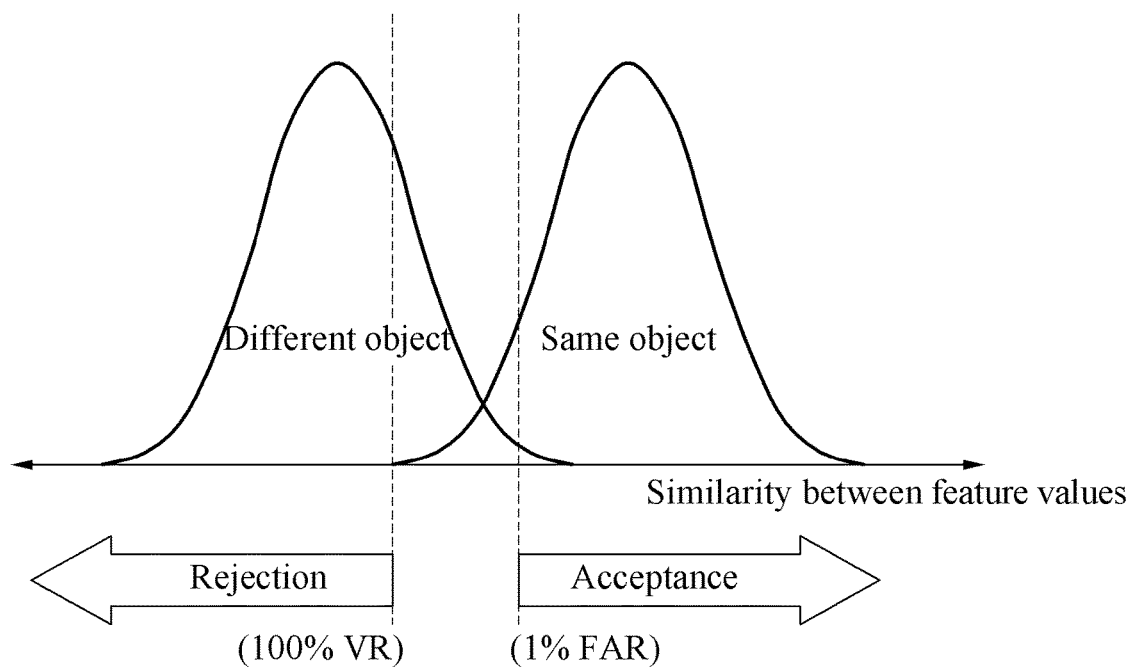

FIGS. 6A and 6B are diagrams illustrating thresholds based on performance indices according to at least one example embodiment. FIG. 6A illustrates a curve for a same object and a curve for a different object. The curve for the same object may be acquired by applying validation data for the same object to a recognizer that is trained in advance. Also, the curve for the different object may be acquired by applying validation data for the different object to the recognizer. In FIG. 6A, an x-axis represents a distance between feature values and a y-axis represents a number of sample pairs.

In an example, when a distance between a feature value extracted from a first sample of an object A and a feature value extracted from a second sample of the object A is calculated, the number of sample pairs for the calculated distance may increase in the curve for the same object. In another example, when a distance between the feature value extracted from the first sample of the object A and a feature value extracted from a first sample of an object B is calculated, the number of sample pairs for the calculated distance may increase in the curve for the different object.

Both the curves may be normal distribution curves. In an example, when a distance between the input image and the registered image is included in a distribution for the same object, authentication of the input image may be accepted. In another example, when the distance between the input image and the registered image is included in a distribution for the different object, authentication of the input image may be rejected. In still another example, when the distance between the input image and the registered image is shown in an overlapping area between the curves, an appropriate determination may be required.

A threshold may be determined based on the curves of FIG. 6A and a desired (or alternatively, predetermined) performance index. The performance index may include an index associated with an FAR and an index associated with a VR. For example, an FAR may be set to 1%, and a VR may be set to 100%. In this example, a distance α corresponding to the FAR of 1% and a distance β corresponding to the VR of 100% may be used as thresholds. When a distance between a feature value of the input image and a feature value of the registered image is less than the distance α, the input image may be accepted. When the distance between the feature value of the input image and the feature value of the registered image exceeds the distance β, the input image may be rejected.

Referring to FIG. 6B, a similarity may be used instead of a distance. A distance between feature values may be in inverse proportion to a similarity between feature values. When the similarity is used instead of the distance, a threshold may also be determined based on an index associated with an FAR and an index associated with a VR. In this example, when a similarity between a feature value of an input image and a feature value of a registered image exceeds a threshold similarity associated with an FAR, the input image may be accepted. When the similarity between the feature value of the input image and the feature value of the registered image is less than a threshold similarity associated with a VR, the input image may be rejected. For example, the FAR may be set to 1%, and the VR may be set to 100%.

In the following description, a distance is used for consistency of description, however, this is merely an example. For example, example embodiments may be changed or expanded to use a similarity instead of the distance as a performance index.

Figure 7:
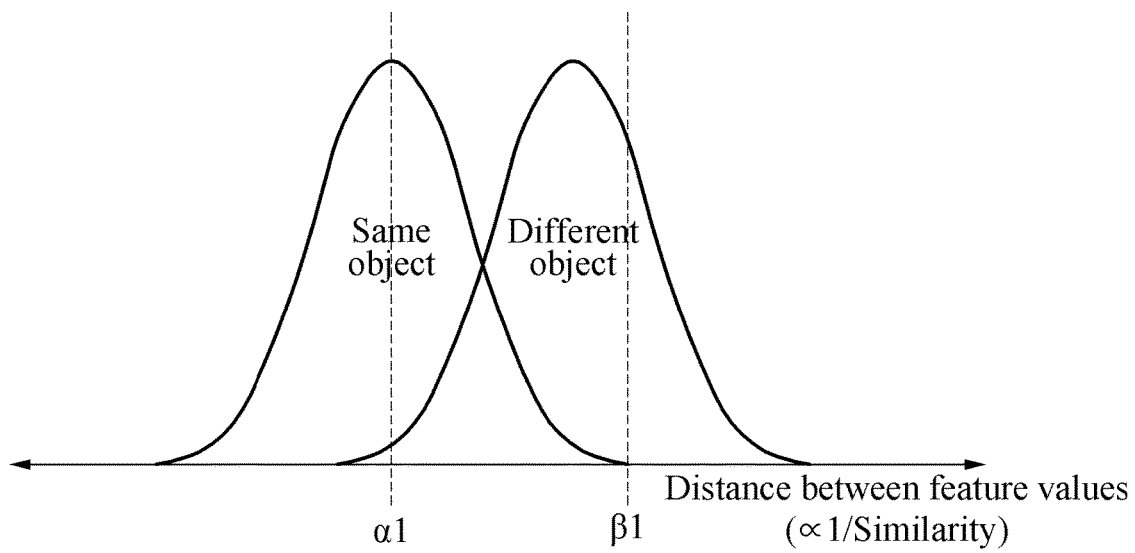
FIG. 7 is a diagram illustrating a relationship between a shape of a graph and a performance index of a recognizer according to at least one example embodiment.
Figure 7:
Figure 7:
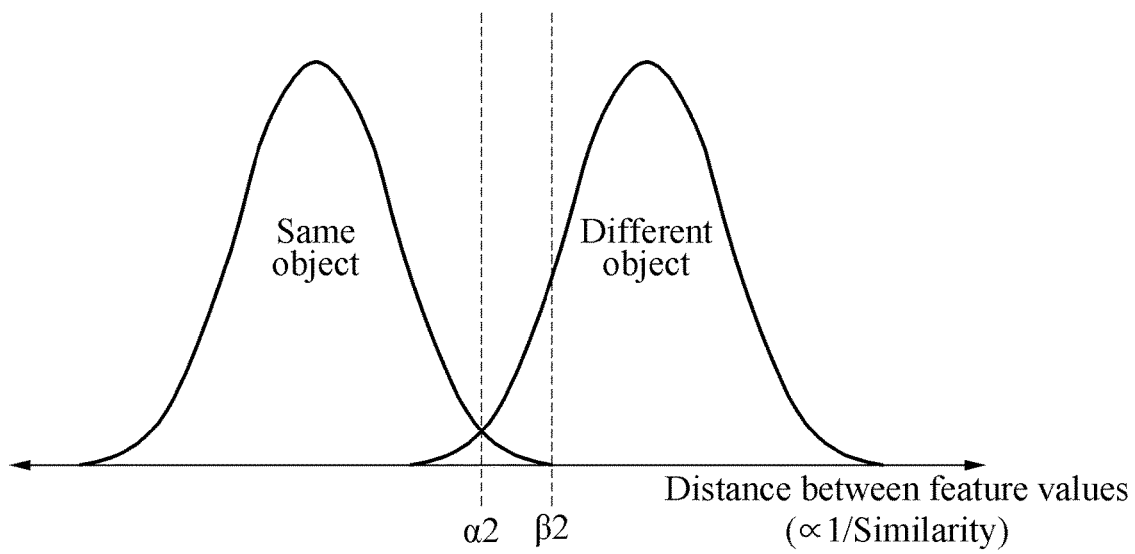

FIG. 7 is a diagram illustrating a relationship between a shape of a graph and a performance index of a recognizer according to at least one example embodiment. Referring to FIG. 7, a graph 10 corresponds to a lower layer, and a graph 20 corresponds to an upper layer. When a layer increases, a distance between a center of a curve for a same object and a center of a curve for a different object may increase. An overlapping area between the curves may decrease. A decrease in the overlapping area may indicate an increase in an authentication accuracy.

As described above, an authentication speed may increase by early authentication. Even though the graph 10 shows a low authentication accuracy in comparison to the graph 20, an early acceptance or early rejection may be determined based on thresholds of the lower layer. For example, when a distance between a feature value of an input image and a feature value of a registered image is less than a threshold α1 that is based on an FAR, the early acceptance may be determined. When the distance between the feature value of the input image and the feature value of the registered image exceeds a threshold β1 that is based on a VR, the early rejection may be determined. In this example, an operation of a higher layer may not need to be performed, and thus the authentication speed may increase. When the distance between the feature value of the input image and the feature value of the registered image has a value between the thresholds α1 and β 1, an operation of a higher layer may be performed to perform authentication.

Figure 8:
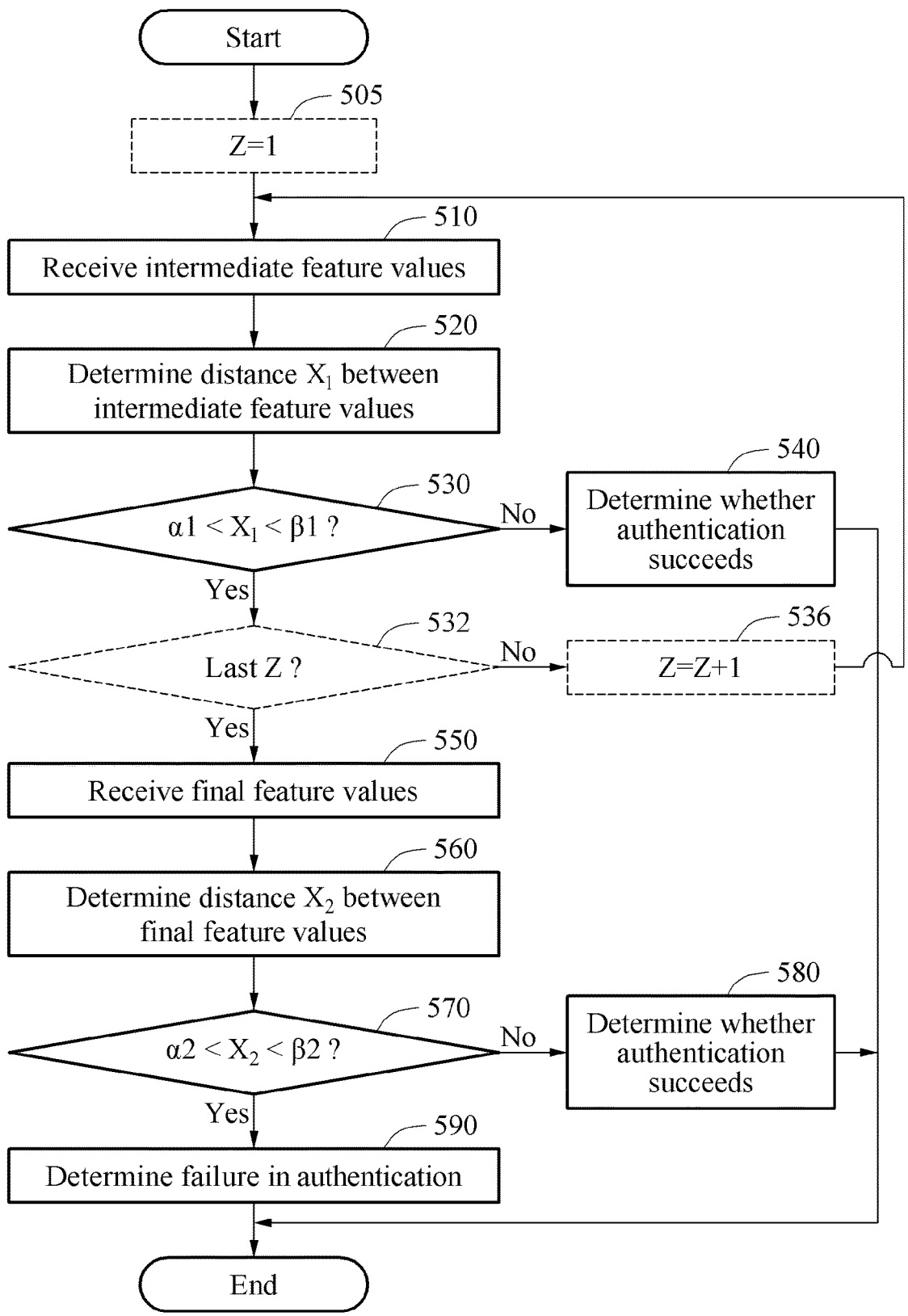
FIG. 8 is a flowchart illustrating an operation of an authentication processor according to at least one example embodiment.

FIG. 8 is a flowchart illustrating an operation of an authentication processor according to at least one example embodiment. Referring to FIG. 8, in operation 510, the authentication processor may receive intermediate feature values. The intermediate feature values may include an intermediate feature value of an input image and an intermediate feature value of a registered image. In operation 520, the authentication processor may determine a distance $X_1$ between the intermediate feature values. The distance $X_1$ may be calculated as a distance between the intermediate feature value of the input image and the intermediate feature value of the registered image.

In operation 530, the authentication processor may compare the distance $X_1$ to thresholds α1 and β1. The threshold α1 may be determined based on the performance index FAR1 and the threshold β1 may be determined based on performance index VR1. When the distance $X_1$ is beyond a range between the thresholds α1 and β1, the authentication processor may perform operation 540. In operation 540, the authentication processor may determine whether authentication succeeds, that is, whether authentication of the input image is accepted or rejected. The authentication of operation 540 may refer to the above-described early authentication. Whether the authentication succeeds may be determined in operation 540 and an authentication process may be terminated, and thus an authentication speed may increase.

When the distance $X_1$ is within the range between the thresholds α1 and β1, the authentication processor may perform operation 550. In operation 550, the authentication processor may receive final feature values. The final feature values may include a final feature value of the input image and a final feature value of the registered image.

In another example embodiment, multiple intermediate layers may be implemented. The authentication processor initializes the layer at 505. If the distance $X_1$ is within the range between the thresholds α1 and β1, the authentication processor may determine whether the intermediate layer is a last intermediate layer at operation 532. If the intermediate layer is a last intermediate layer, then operation 550 may be performed. If the intermediate layer is not the last intermediate layer, then the authentication processor uses a next intermediate layer at operation 536 and operations 510-530 may be repeated.

In operation 560, the authentication processor may determine a distance $X_2$ between the final feature values. The distance $X_2$ may be calculated as a distance between the final feature value of the input image and the final feature value of the registered image.

In operation 570, the authentication processor may compare the distance $X_2$ to thresholds α2 and β2. The threshold α2 may be determined based on the performance index FAR2 and the threshold β2 may be determined based on a performance index VR2. The performance indices FAR2 and VR2 may be different from the FAR1 and VR1, however, there is no limitation thereto. For example, the same FAR and the same VR may be used to determine the thresholds α1, β1, α2 and β2 regardless of layers. Also, when a layer increases, FARs and VRs may increase or decrease. When the distance $X_2$ is beyond a range between the thresholds α2 and β2, the authentication processor may determine whether authentication succeeds in operation 580. The authentication processor may determine whether the input image is to be accepted or rejected. When the distance $X_2$ is within the range between the thresholds α2 and β2, the authentication processor may determine that the authentication fails in operation 590. When the authentication is determined to fail, the authentication process may be terminated without a change. Also, based on a political determination (i.e., standards and/or procedures set forth by an entity implementing the authentication), operation 510 may be re-performed with respect to the input image, or may be performed with respect to a new input image, although not shown in the drawings.

Figure 9:
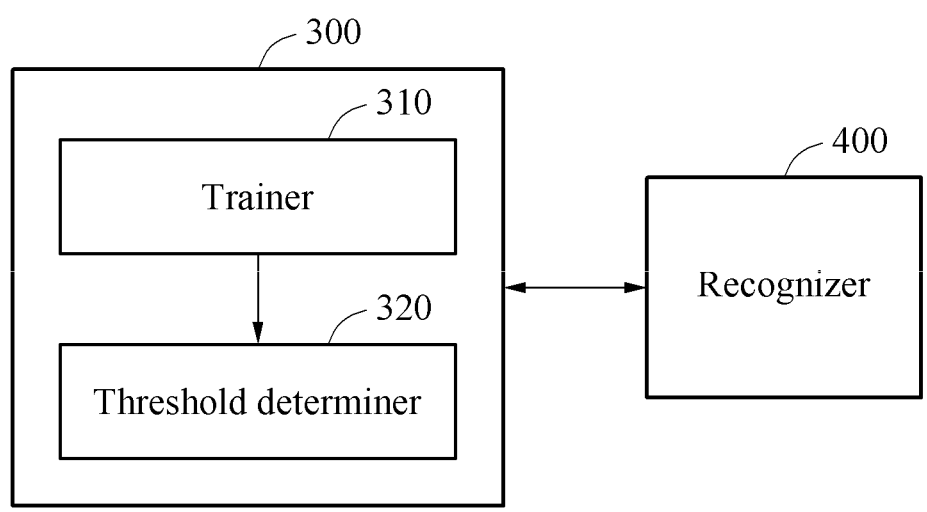
FIG. 9 is a block diagram illustrating a training apparatus and a recognizer according to at least one example embodiment.

FIG. 9 is a block diagram illustrating a training apparatus 300 and a recognizer 400 according to at least one example embodiment. Referring to FIG. 9, the training apparatus 300 may include a trainer 310 and a threshold determiner 320. The trainer 310, the threshold determiner 320 and the recognizer 400 may be implemented as at least one hardware module or a combination of hardware and software such as a processing device executing computer-readable instructions stored in the memory 130.

The trainer 310 may train the recognizer 400 based on a training sample. The trainer 310 may adjust a parameter of the recognizer 400 based on an output value of the recognizer 400 in response to an input of the training sample. The threshold determiner 320 may determine a threshold using the trained recognizer 400. The threshold determiner 320 may acquire the graphs 10 and 20 of FIG. 7 based on output values of the recognizer 400 in response to an input of validation data. The threshold determiner 320 may determine a threshold for each layer.

Figure 10:
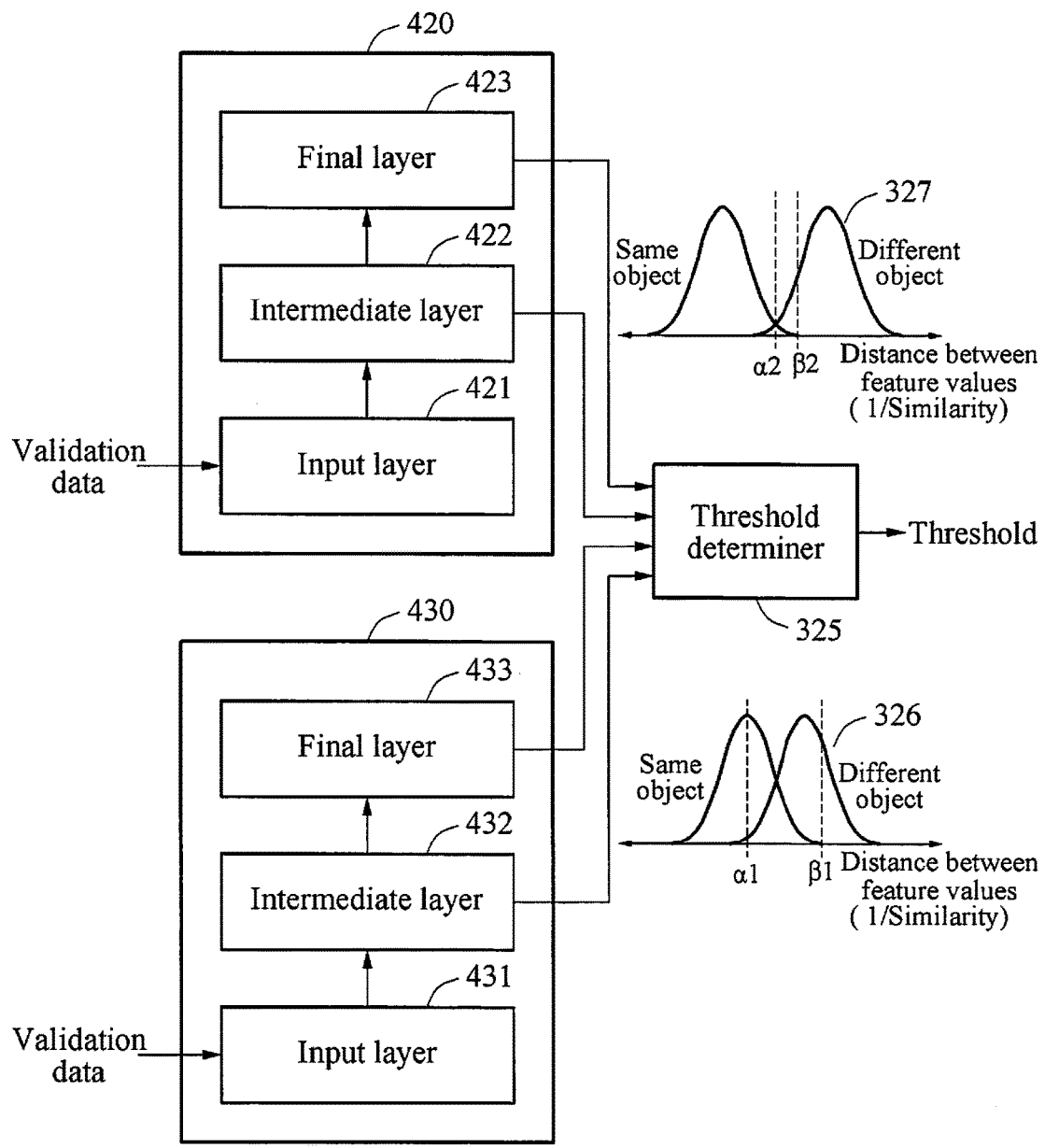
FIG. 10 is a block diagram illustrating a process of determining a threshold according to at least one example embodiment.

FIG. 10 is a block diagram illustrating a process of determining a threshold according to at least one example embodiment. Referring to FIG. 10, a threshold determiner 325 may determine a threshold based on feature values received from a first recognizer 420 and a second recognizer 430 that are trained. For convenience of description, the first recognizer 420 and the second recognizer 430 are independently illustrated in FIG. 10, however, there is no limitation thereto. For example, a single recognizer may be used.

The first recognizer 420 may include an input layer 421, an intermediate layer 422 and a final layer 423. The second recognizer 430 may include an input layer 431, an intermediate layer 432 and a final layer 433. Based on validation data, the intermediate layer 422 may output intermediate feature values and the final layer 423 may output final feature values. Based on validation data, the intermediate layer 432 may output intermediate feature values and the final layer 433 may output final feature values. The validation data may include data for a same object and data for a different object.

The threshold determiner 325 may acquire a graph 326 of a first distribution by comparing the intermediate feature values. Also, the threshold determiner 325 may acquire a graph 327 of a second distribution by comparing the final feature values. The description of FIGS. 6A, 6B and 7 may be applicable to the graphs 326 and 327. The threshold determiner 325 may acquire distributions for feature values of each layer (e.g., first to final).

The threshold determiner 325 may determine a threshold based on a desired (or alternatively, predetermined) performance index. The threshold determiner 325 may determine intermediate thresholds for the intermediate layers 422 and 432 based on the graph 326, and may determine final thresholds for the final layers 423 and 433 based on the graph 327. For example, an intermediate threshold may include thresholds $\alpha 1$ and $\beta 1$ that are determined based on an FAR1 and a VR1, respectively. A final threshold may include thresholds $\alpha 2$ and $\beta 2$ that are determined based on an FAR2 and a VR2, respectively.

Figure 11:
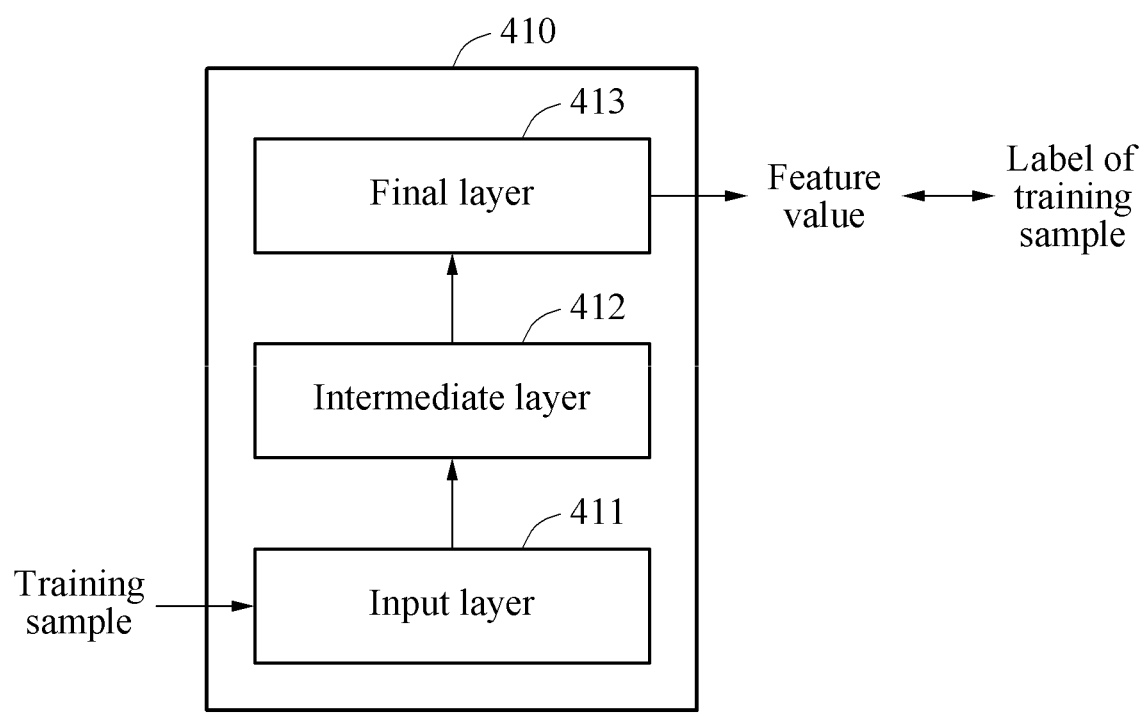
FIG. 11 is a block diagram illustrating an example of a process of training a recognizer according to at least one example embodiment.

FIG. 11 is a block diagram illustrating a process of training a recognizer 410 according to at least one example embodiment. Referring to FIG. 11, the recognizer 410 may include an input layer 411, an intermediate layer 412 and a final layer 413. The recognizer 410 may output a feature value in response to an input of a training sample. A trainer may apply the training sample to the recognizer 410, and may train the recognizer 410 based on the feature value output from the recognizer 410. The training sample may include images for an authentication. For example, the training sample may include a face image, and may include a label for identifying a face. The trainer may repeatedly train the recognizer 410 so that the feature value output from the final layer 413 of the recognizer 410 may be corresponding to the label.

Figure 12:
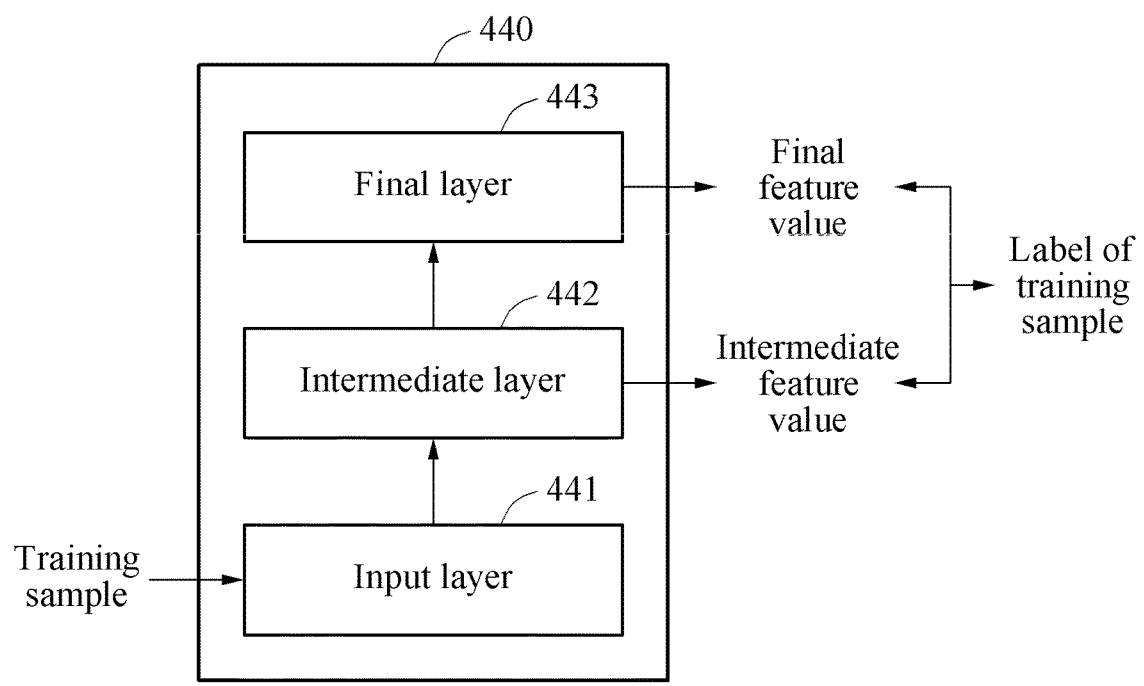
FIG. 12 is a block diagram illustrating another example of a process of training a recognizer according to at least one example embodiment.

FIG. 12 is a block diagram illustrating a process of training a recognizer 440 according to at least one example embodiment. Referring to FIG. 12, the recognizer 440 may include an input layer 441, an intermediate layer 442 and a final layer 443. The intermediate layer 442 may output an intermediate feature value, and the final layer 443 may output a final feature value. The recognizer 440 may be trained based on the intermediate feature value and the final feature value. For example, a trainer may train the recognizer 440 so that both the intermediate feature value and the final feature value may be matched to a label of a training sample. When the recognizer 440 is trained based on the intermediate feature value, a probability of early authentication or a number of times the early authentication is performed may increase.

Figure 13:
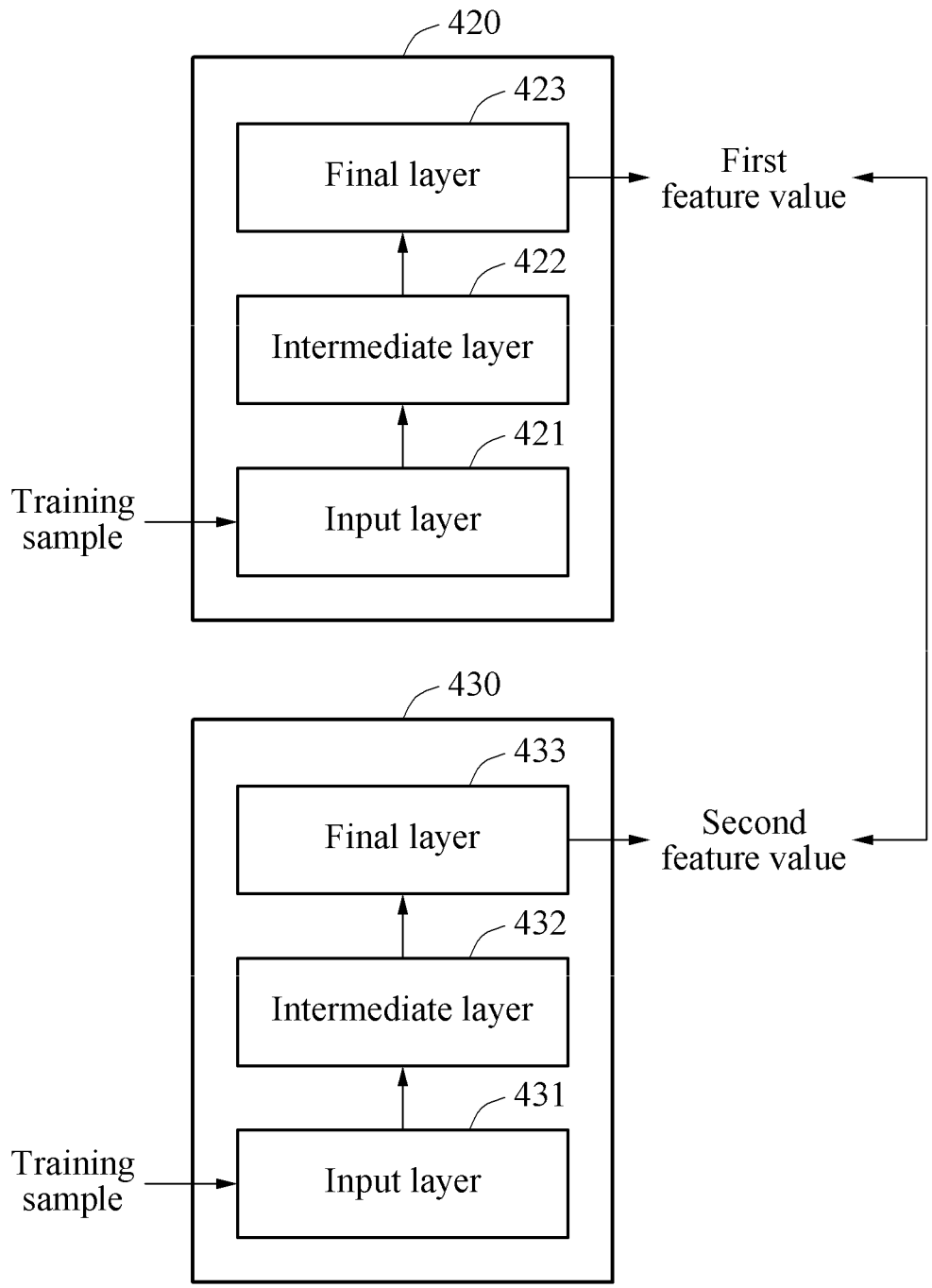
FIG. 13 is a block diagram illustrating an example of a process of training a plurality of recognizers according to at least one example embodiment.

FIG. 13 is a block diagram illustrating a process of training a plurality of recognizers according to at least one example embodiment. For example, a trainer may train a plurality of recognizers. The plurality of recognizers may include, for example, the first recognizer 420 and the second recognizer 430 of FIG. 10. The first recognizer 420 may include the input layer 421, the intermediate layer 422 and the final layer 423, and the second recognizer 430 may include the input layer 431, the intermediate layer 432 and the final layer 433. The trainer may train the first recognizer 420 and the second recognizer 430 based on a training sample for a same object and a training sample for a different object. The trainer may train the first recognizer 420 and the second recognizer 430 based on the training sample for the same object so that a distance between a first feature value output from the first recognizer 420 and a second feature value output from the second recognizer 430 may decrease. Also, the trainer may train the first recognizer 420 and the second recognizer 430 based on the training sample for the different object so that the distance between the first feature value and the second feature value may increase.

Figure 14:
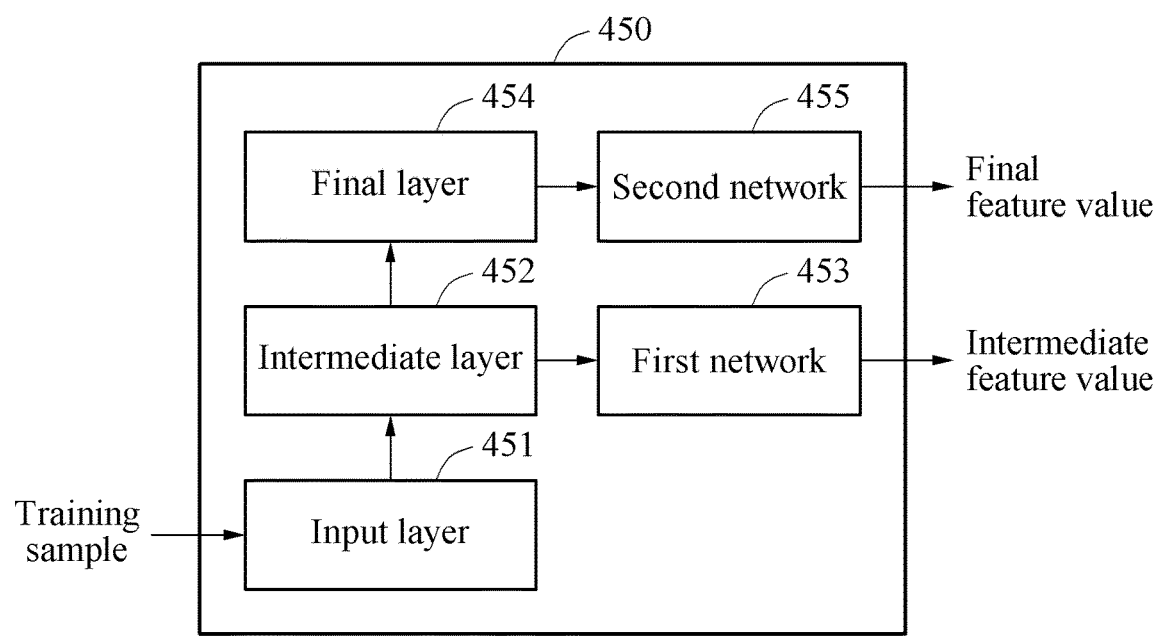
FIG. 14 is a block diagram illustrating still another example of a process of training a recognizer according to at least one example embodiment.

FIG. 14 is a block diagram illustrating a process of training a recognizer 450 according to at least one example embodiment. Referring to FIG. 14, the recognizer 450 may include an input layer 451, an intermediate layer 452, a final layer 454, a first network 453 and a second network 455. The input layer 451, the intermediate layer 452, the final layer 454, the first network 453 and the second network 455 may be implemented as at least one hardware module, at least one hardware module executing software, or a combination thereof.

The recognizer 450 may output an intermediate feature value and a final feature value based on a training sample. An output of the intermediate layer 452 may be input to the first network 453, and the first network 453 may output the intermediate feature value. Also, an output of the final layer 454 may be input to the second network 455, and the second network 455 may output the final feature value. The first network 453 and the second network 455 may have structures to increase a probability of early authentication. For example, each of the first network 453 and the second network 455 may include a convolution layer, a fully connected network, and the like.

A trainer may train the intermediate layer 452 so that the intermediate feature value may be matched to a label of the training sample. Also, the trainer may train the intermediate layer 452 and the final layer 454 so that the final feature value may be matched to the label of the training sample. In addition, the trainer may train the first network 453 and the second network 455 together. The recognizer 450 that includes the first network 453 and the second network 455 and that is trained based on the intermediate feature value and the final feature value may increase the probability of the early authentication.

Figure 15:
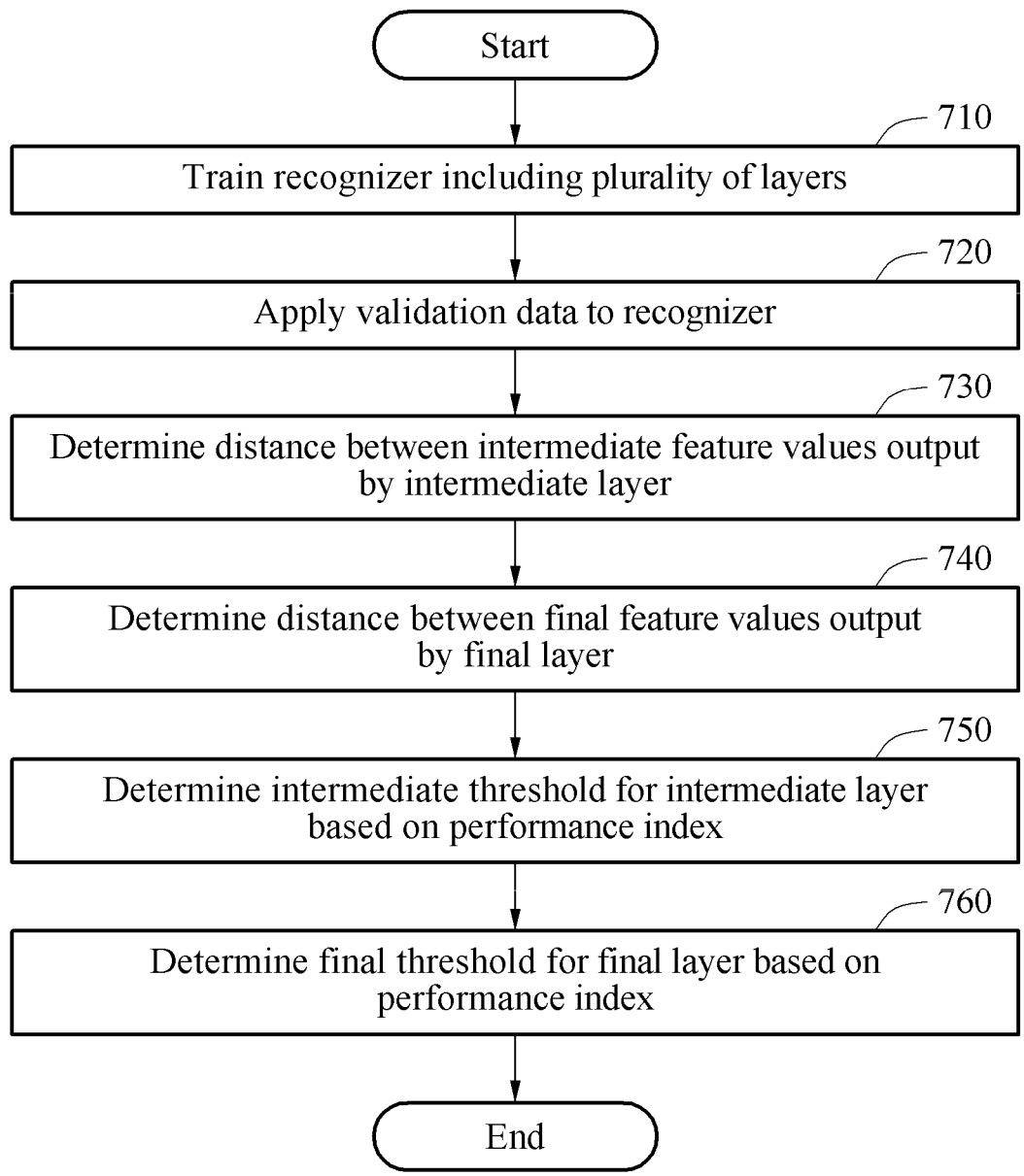
FIG. 15 is a flowchart illustrating a process of determining a threshold according to at least one example embodiment.

FIG. 15 is a flowchart illustrating a process of determining a threshold according to at least one example embodiment. Referring to FIG. 15, in operation 710, a recognizer including a plurality of layers may be trained. Operation 710 may be performed by the above-described trainer. In operation 720, validation data may be applied to the recognizer. In operation 730, a distance between intermediate feature values output by an intermediate layer included in the recognizer may be determined. In operation 740, a distance between final feature values output by a final layer included in the recognizer may be determined. In operation 750, an intermediate threshold for the intermediate layer may be determined based on a desired (or alternatively, predetermined) performance index. In operation 760, a final threshold for the final layer may be determined based on the performance index. Different performance indices may be set based on the intermediate layer and the final layer, or the same performance index may be set regardless of a type of layers. Operations 720 through 760 may be performed by the above-described threshold determiner.

Figure 16:
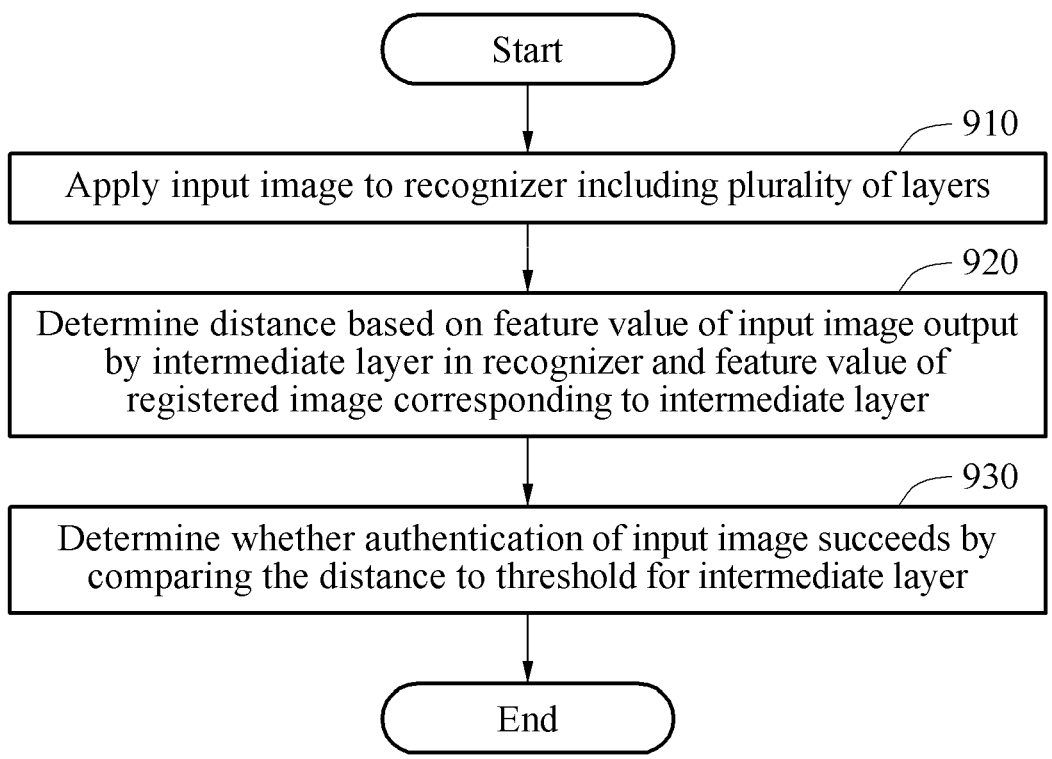
FIG. 16 is a flowchart illustrating an authentication process according to at least one example embodiment.

FIG. 16 is a flowchart illustrating an authentication process according to at least one example embodiment. Referring to FIG. 16, in operation 910, an input image may be applied to a recognizer including a plurality of layers. Operation 910 may be performed by the above-described recognizer. In operation 920, a distance between a feature value of the input image output by an intermediate layer included in the recognizer and a feature value of a registered image corresponding to the intermediate layer may be determined. In operation 930, whether authentication of the input image succeeds may be determined by comparing the distance to a threshold for the intermediate layer. Operations 920 and 930 may be performed by the above-described authentication processor.

Figure 17:
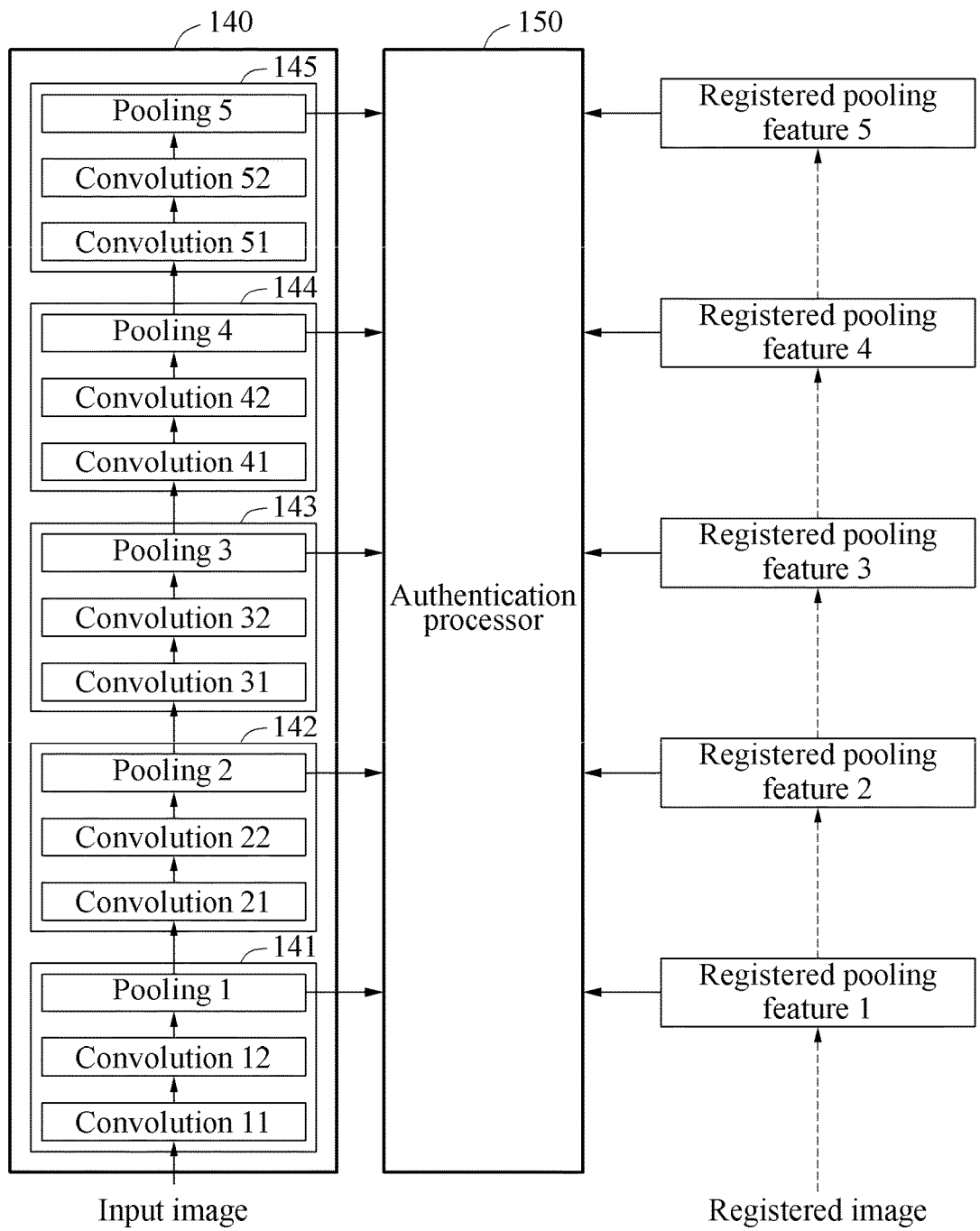
FIG. 17 is a block diagram illustrating an internal structure of a recognizer and an authentication processor according to at least one example embodiment.

FIG. 17 is a block diagram illustrating an internal structure of a recognizer 140 and an authentication process according to at least one example embodiment. Referring to FIG. 17, the recognizer 140 may include a plurality of layers, for example, layers 141, 142, 143, 144 and 145. Each of the layers 141 through 145 may include convolution layers and a pooling layer. Each of the layers 141 through 145 may be repeated for various purposes. For example, an output of a convolution layer 11 may be transferred to a convolution layer 12, and an output of the convolution layer 12 may be transferred to a pooling layer 1. The above-described configuration of the layers 141 through 145 is merely an example and may be variously changed. Pooling of a registered image may be performed based on registered pooling features 1, 2, 3, 4 and 5. The registered pooling features 1 through 5 may be applied to an authentication processor 150. The authentication processor 150 may sequentially compare the registered pooling features 1 through 5 to features received from the layers 141 through 145, and may determine whether authentication succeeds. For example, the authentication processor 150 may compare a first threshold to a distance between an output of the layer 141 and the registered pooling feature 1, to determine whether early authentication succeeds.

Figure 18:
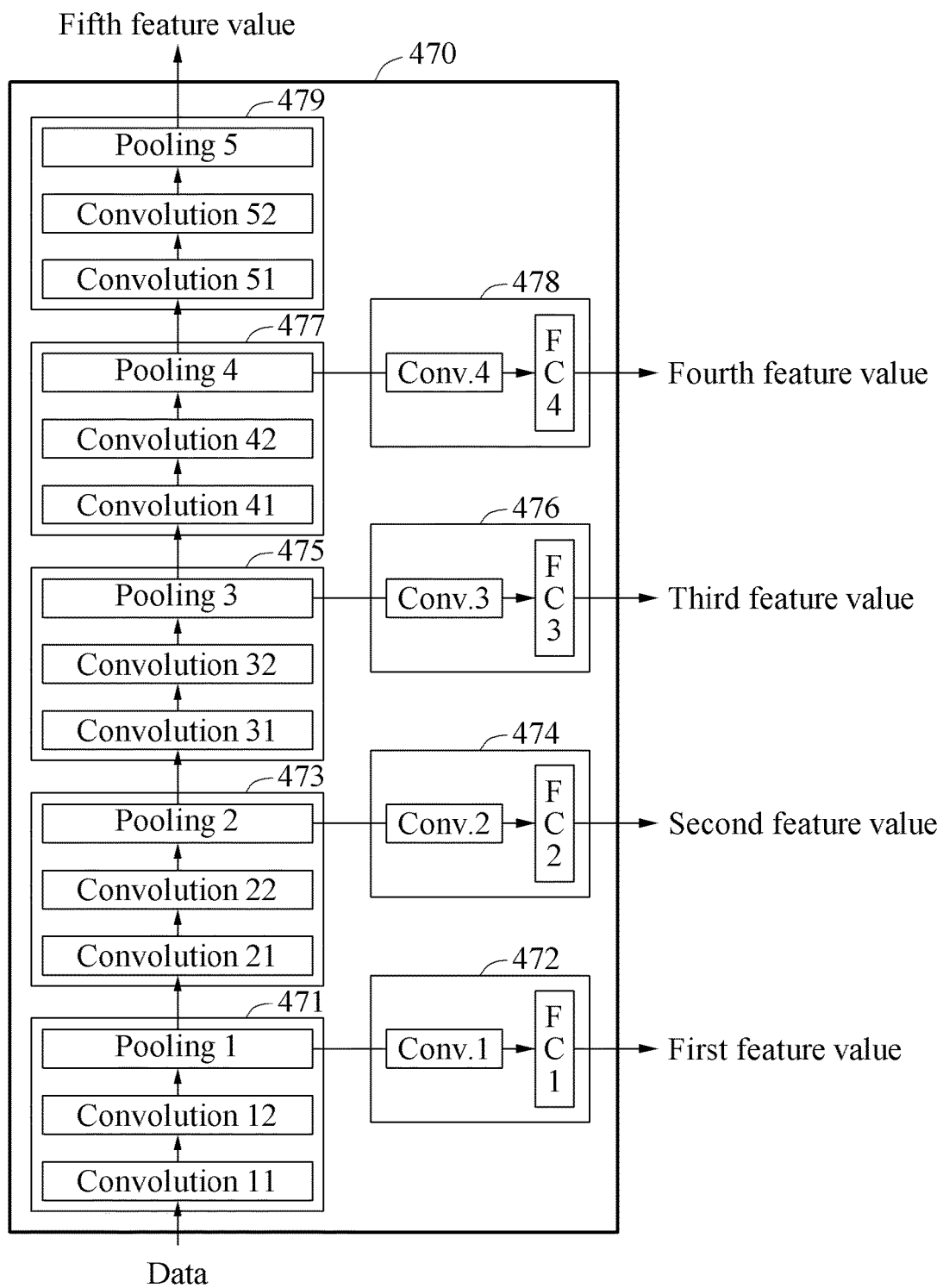
FIG. 18 is a block diagram illustrating an internal structure of a recognizer and a process of training the recognizer according to at least one example embodiment.

FIG. 18 is a block diagram illustrating an internal structure of a recognizer 470 and a process of training the recognizer 470 according to at least one example embodiment. Referring to FIG. 18, the recognizer 470 may include a plurality of layers, for example, layers 471, 473, 475, 477 and 479. Each of the layers 471, 473, 475, 477 and 479 may include convolution layers and a pooling layer. At least a portion of the layers 471, 473, 475, 477 and 479 may be connected to additional networks 472, 474, 476 and 478. Each of the additional networks 472, 474, 476 and 478 may include a convolution layer and a fully connected network. The additional networks 472, 474, 476 and 478 may output a first feature value, a second feature value, a third feature value and a fourth feature value, respectively, based on outputs of the layers 471, 473, 475 and 477. The recognizer 470 may be trained based on the first feature value through a fifth feature value and a label of training data. Each of the layers 471, 473, 475, 477 and 479 may be repeated for various purposes. For example, an output of a pooling layer 1 may be transferred to a convolution layer 1, and an output of the convolution layer 1 may be transferred to a fully connected network 1. The above-described configuration of the layers 471, 473, 475, 477 and 479 is merely an example and may be variously changed.

Figure 19:
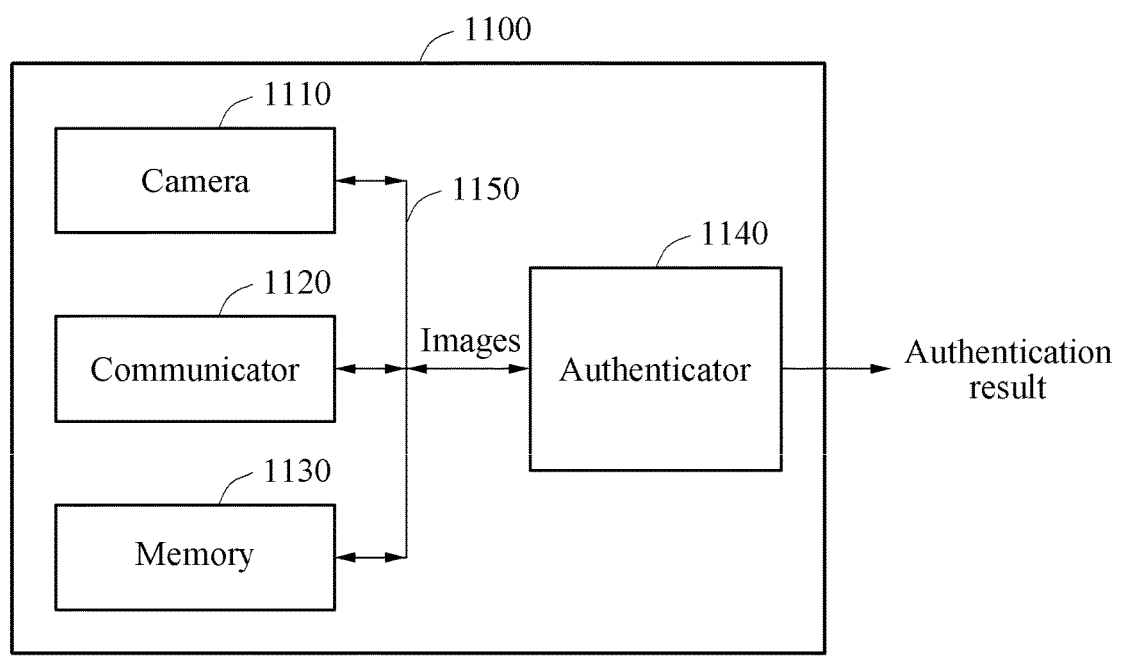
FIG. 19 is a block diagram illustrating an electronic apparatus according to at least one example embodiment.

FIG. 19 is a block diagram illustrating an electronic apparatus 1100 according to at least one example embodiment. Referring to FIG. 19, the electronic apparatus 1100 may include a camera 1110, a communicator 1120, a memory 1130, an authenticator 1140 and a bus 1150. The camera 1110, the communicator 1120, the memory 1130 and the authenticator 1140 may communicate using the bus 1150. The electronic apparatus 1100 may be included in, for example, a smartphone, a smart TV, a desktop computer, a notebook computer, or a tablet personal computer (PC).

As described above, the authenticator 1140 may output an authentication result based on images. The authenticator 1140 may include a recognizer trained in advance based on a training sample, and an authentication processor configured to output an authentication result based on a threshold. The authenticator 1140 may output the authentication result based on images received from the camera 1110, the communicator 1120 and the memory 1130. The images may include an input image and a registered image that are described above. For example, the input image may be received from the camera 1110, and the registered image may be received from the memory 1130. The registered image may include a face image of a user.

The authenticator 1140 may include hardware configured to execute software or hardware. For example, the authenticator 1140 may include one or more processors and may perform the functions described herein by executing computer-readable instructions stored in the memory 1130.

The camera 1110 may acquire the input image using an image sensor. The camera 1110 may provide the input image to the authenticator 1140. The communicator 1120 may communicate with an external device using various communication technologies. The communicator 1120 may provide the authenticator 1140 with images received from the external device. The memory 1130 may store a variety of data. For example, the memory 1130 may store thresholds corresponding to a plurality of layers, and feature values of the registered image corresponding to the plurality of layers. The memory 1130 may provide stored data to the authenticator 1140.

Figure 20:
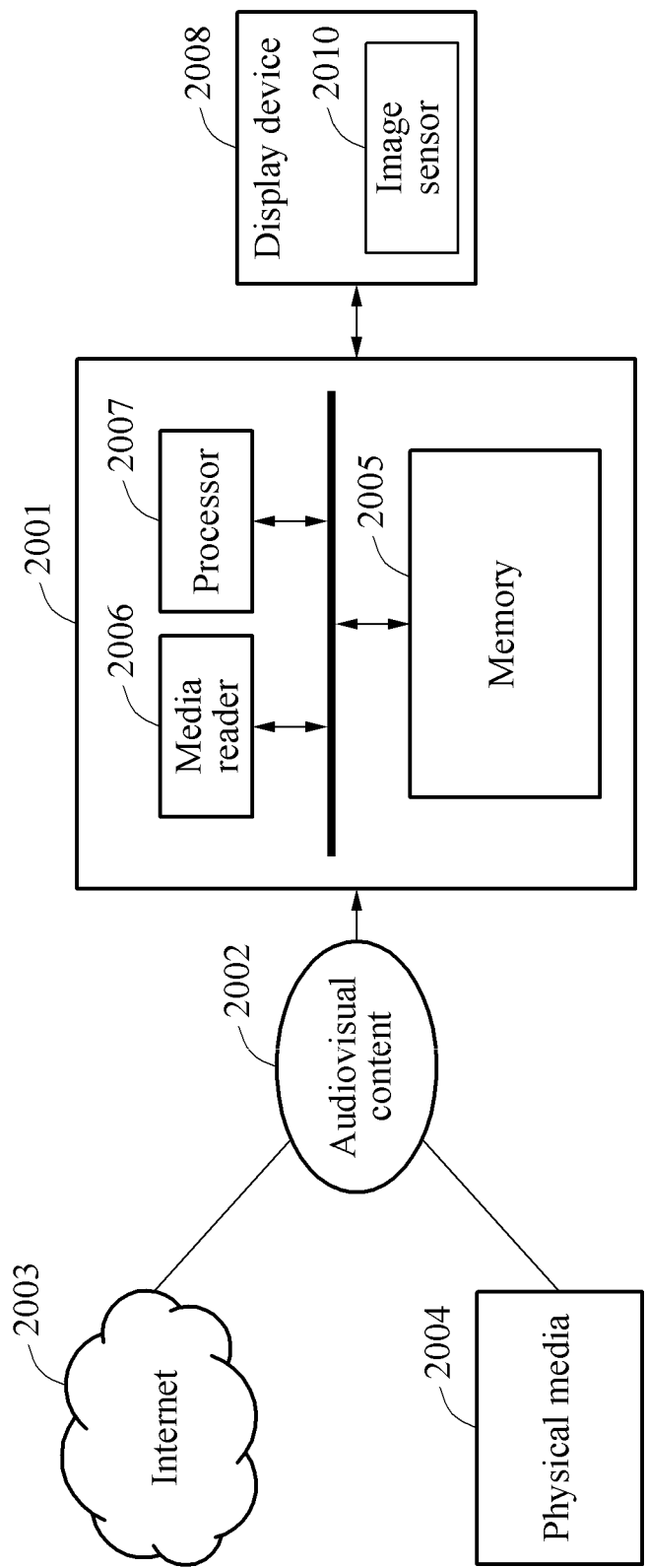
FIG. 20 illustrates an authentication apparatus in a system for setting audiovisual content according to at least one example embodiment.

FIG. 20 illustrates an authentication apparatus in a system for setting audiovisual content according to at least one example embodiment.

As shown in FIG. 20, a receiver 2001 receives audiovisual content 2002. The audiovisual content 2002 may be stored on a server linked to the receiver via a network 203 (e.g., Internet). The receiver comprises a memory 2005. This memory 2005 is able to store the received audiovisual content 2002. The audiovisual content 2002 may be also stored on a physical media 2004 (e.g., Blu-ray disc). The receiver 2001 includes a processor 2007 which is configured, upon receiving of an adequate set of instructions stored on the memory 2005, to decode the audiovisual content 2002 before rendering it. Optionally, the receiver 2001 comprises a media reader 2006 adapted to read the audiovisual content 2002 stored on the physical media 2004 (e.g., Blu-Ray reader). The memory 2005 also stores computer-readable instructions for the processor 2007 to perform the functions of an authentication apparatus, as described in FIGS. 1-19. The system comprises means for rendering the audiovisual content 2002, for example, a display device 2008. The display device 2008 includes an image sensor 2010. The image sensor 2010 obtains an image of a user using the display device 2008. Moreover, the processor 2007 and the image sensor 2010 may form the authentication apparatus. The processor 1007 performs the functions of the authentication apparatus and those described with reference to FIGS. 1-19 by executing computer-readable instructions stored in the memory 2005.

The audiovisual content 2002 contains frames associated with a watching level. A watching level is an indication indicating how offensive a part of the audiovisual content 2002 such as a violence level. The watching level may be based on the images of the audiovisual content 2002, on the audio part, on the text of subtitles, or any combination of them. The watching level may for example take the form of, on one side, the category of the offensive content (for example violence, sex, horror), and on another side, a value associated to this category (this may be for example a value comprised between 1 and 10: the greater this value is, the more offensive according to the chosen category the associated content is).

The audiovisual content 2002 may contain audiovisual segments and/or frames respectively associated with watching levels; both frames and segments are supposed to be representative of a degree of offensiveness of part or whole of the audiovisual content 2002. The watching level may be a part of the metadata of the audiovisual content 2002. It may also be manually annotated very early in the process of producing the audiovisual content 2002. The segments or the frames may be also associated with watching levels in an automated manner. If the watching level corresponds to a violence scale for example, then audiovisual segments and/or frames related to violent scenes, and/or frames will be detected and graded according to the violence scale. Methods and techniques allowing such detections are known and can be found for example in Gong et al., Detecting Violent Scenes in Movies by Auditory and Visual Cues, 9th Pacific Rim Conference on Multimedia, Natl Cheng Kung Univ. Tainan TAIWAN, Dec. 9-13, 2008, pp. 317-326, the entire contents of which are hereby incorporated by reference.

Once the audiovisual content 2002 is received by the receiver 2001, the processor 2007 executes instructions stored on the memory 2005. Once the processor 2007 has analyzed the audiovisual content 2002, at least two frames, each being respectively associated with a watching level, are permitted to be displayed on the display device 2008. The processor 2007 then chooses which frame to display that corresponds to an authenticated user using the display device 2008. The user is authenticated by the authentication apparatus using early authentication, as described with respect to FIGS. 1-19.

More specifically, the memory 2005 stores desired watching levels associated with authenticated users. The processor 2007 selects a frame such that the watching level associated with the selected frame does not exceed the desired watching levels associated with the authenticated user using the display device 2008.

Figure 21:
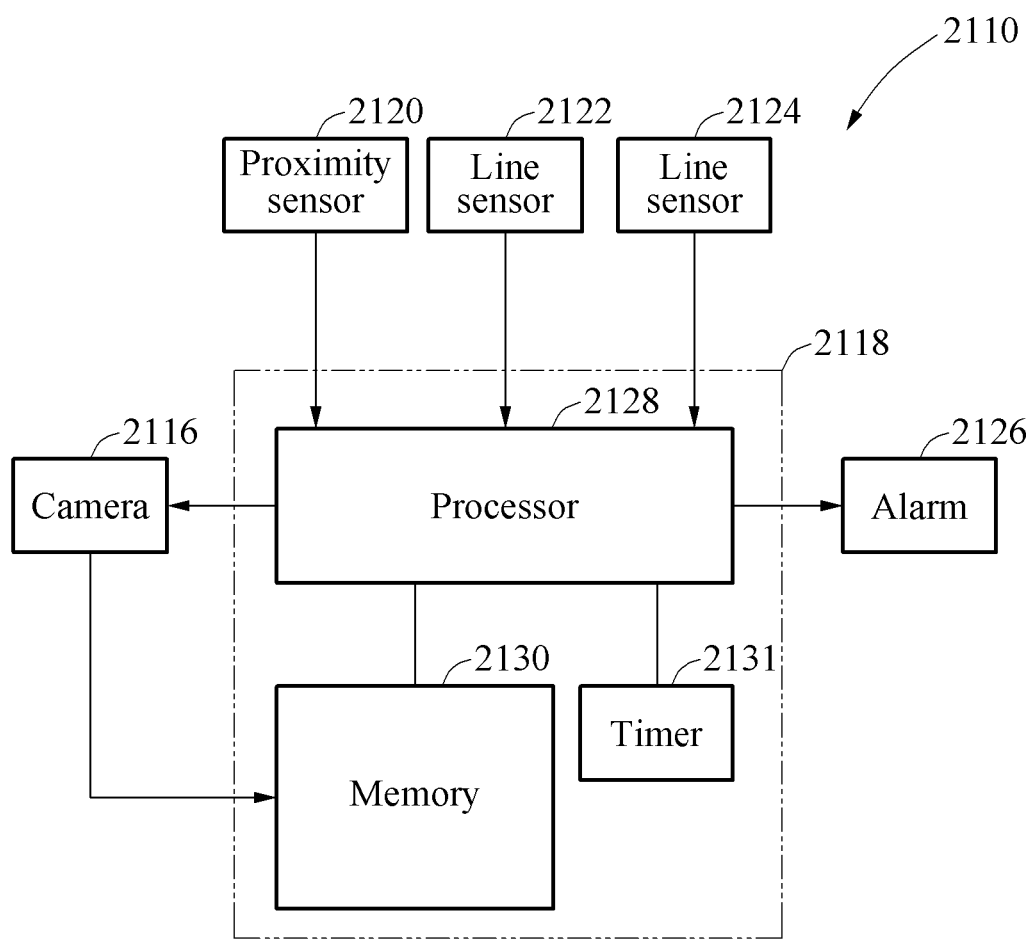
FIG. 21 illustrates an authentication apparatus in a system for enforcing parking according to at least one example embodiment.

FIG. 21 illustrates an authentication apparatus in a system for enforcing parking according to at least one example embodiment.

As shown in FIG. 21, a system for parking spot enforcement 2110 uses the authentication apparatus (e.g., a processor 2128, a camera 2116 and a memory 2130) and a proximity sensor 2120 (e.g., one or more ultrasonic sensors) for detecting entry of a vehicle within a parking space or a parking spot designated for use by disabled people or a reserved parking spot and for authenticating a driver or passenger of the vehicle. The processor 2128 performs the functions of the authentication apparatus and those described with reference to FIGS. 1-19 by executing computer-readable instructions stored in the memory 2130.

An alarm 2126 is also positioned adjacent the parking spot, and the alarm 2126 is actuated for a pre-set period of time, such as 30 seconds, for example, if the driver and/or passenger is not authenticated. The alarm 2126 can be any suitable type of alarm, such as an audio alarm, such as generating an alert by a speaker, or a visual alarm, such as generating a visual alert by a light source, or a combination thereof. A camera 2116 is also positioned adjacent the parking spot for capturing a photographic image of the driver and/or passenger.

It should be understood that any of various suitable types of cameras can be utilized and/or various types of visual sensors or image sensors can also be utilized in this regard, for example. The alarm 2126, the camera 2116, the proximity sensor 2120, and line sensors 2122, 2124 (to be described below) are each in electrical communication with a controller 2118.

The picture taken by the camera 2116 is used by the processor 2128 and the memory 2130 to authenticate the driver and/or passenger as described above with reference to FIGS. 1-19. Additionally, the line sensors 2122, 2124 are provided for detecting if the vehicle is properly parked within the designated boundaries of the parking space or parking. If the vehicle is parked over one of the line markings (i.e., partially parked in an adjacent space), then the alarm 2126 can be actuated, for example.

It should be understood that the proximity sensor 2120 and the line sensors 2122, 2124 can be any of various suitable types of sensors for detecting the presence of the vehicle.

Figure 22:
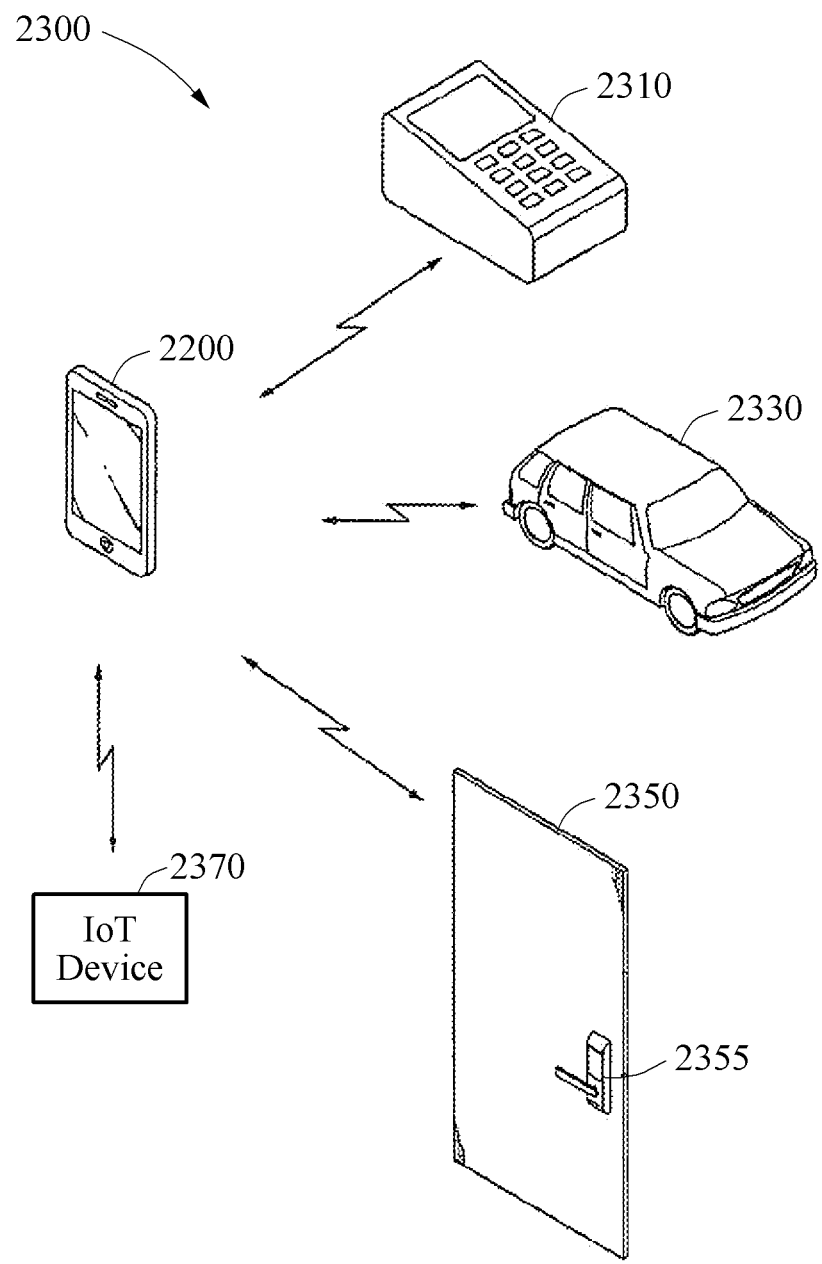
FIG. 22 is a diagram of an authentication system including an authentication apparatus according to at least one example embodiment.

FIG. 22 is a diagram of an authentication system 2300 including an authentication apparatus 2200. The authentication apparatus 2220 may operate in accordance with the authentication apparatus described in accordance with FIGS. 1-19. The authentication apparatus 2200 may be used as a device for mobile payment, a device for security solution, or a device for authentication solution. The authentication apparatus 2200 may communicate wireless signals with an automobile 2330, a digital door lock 2355 of a door 2350, a payment terminal 2310, and an IoT device 2370 using the wireless communication module 2240.

The processor 2220 of the authentication apparatus 2200 may execute a mobile payment application program or software stored in a memory (e.g., the memory 130). User payment information for mobile payment may safely be stored in a secure area of the memory 2230 according to the control of the processor 2220. At this time, the user payment information may be encoded and stored in the secure area of the memory.

The mobile payment application program may perform mobile payment in association with the payment terminal 2310 using the user payment information stored in the secure area of the memory. The user payment information may include identification information (e.g., credit card information, password, and registered images) by which an authentic user of the authentication device 2200 is identified. The identification information may be registered in the secure area of the memory by the authentic user of the authentication device 2200 using the mobile payment application program.

The at least one example embodiment described herein may be implemented using hardware components, hardware components executing software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication method comprising:
    applying an input image to a recognizer, the recognizer including a plurality of layers of a deep learning (DL) network, the input image including a first object; and
    determining whether the first object is the same as a second object in a registered image, the determining including,
        determining a similarity or a distance between at least one feature value of the input image and at least one feature value of the registered image corresponding to a first layer of the layers in the recognizer, the at least one feature value of the input image output by the first layer of the layers in the recognizer,
        determining whether the determined similarity or distance is within a threshold range corresponding to the first layer of the layers in the recognizer, the threshold range corresponding to the first layer of the layers in the recognizer being different than a threshold range corresponding to a second layer of the layers in the recognizer, and
        authenticating the input image based on whether the similarity or the distance is within the threshold range corresponding to the first layer of the layers in the recognizer.

2. The authentication method of claim 1, wherein the authenticating comprises:
    determining whether the input image is accepted or rejected.

3. The authentication method of claim 1, wherein the first layer belongs to a plurality of intermediate layers, and the determining whether the first object is the same as the second object in the registered image comprises:
    determining whether the authenticating succeeds based on feature values of the input image and feature values of the registered image, the feature values of the input image output by the intermediate layers, respectively, and the feature values of the registered image corresponding to the intermediate layers, respectively.

4. The authentication method of claim 1, wherein the determining whether the first object is the same as the second object in the registered image comprises:
    determining the similarity between the at least one feature value of the input image and the at least one feature value of the registered image, the authenticating being based on the determined similarity.

5. The authentication method of claim 4, wherein the authenticating comprises:
    determining that the input image is accepted when the determined similarity exceeds a similarity corresponding to a false acceptance rate (FAR) of the first layer.

6. The authentication method of claim 5, wherein the authenticating comprises:
    determining that the input image is rejected when the determined similarity is less than a similarity corresponding to a verification rate (VR) of the first layer, the similarity corresponding to the FAR and the similarity corresponding to the VR being different.

7. The authentication method of claim 6, wherein the determining whether the first object is the same as the second object in the registered image comprises:
proceeding to a next layer of the recognizer when the determined similarity exceeds the similarity corresponding to the VR and is less than the similarity corresponding to the FAR.

8. The authentication method of claim 4, wherein the threshold range comprises a first threshold part based on a false acceptance rate (FAR) and a second threshold part based on a verification rate (VR).

9. The authentication method of claim 8, wherein the first threshold part is greater than the second threshold part.

10. The authentication method of claim 1, wherein the determining whether the first object is the same as the second object in the registered image comprises:
determining the distance between the at least one feature value of the input image and the at least one feature value of the registered image, the authenticating being based on the determined distance.

11. The authentication method of claim 10, wherein the authenticating comprises:
determining that the input image is accepted when the determined distance is less than a distance corresponding to a false acceptance rate (FAR) of the first layer.

12. The authentication method of claim 11, wherein the authenticating comprises:
determining that the input image is rejected when the determined distance exceeds a distance corresponding to a verification rate (VR) of the first layer.

13. The authentication method of claim 12, wherein the determining whether the first object is the same as the second object in the registered image comprises:
proceeding to a next layer of the recognizer when the determined distance exceeds the distance corresponding to the FAR and is less than the distance corresponding to the VR.

14. The authentication method of claim 10, wherein the threshold range comprises a first threshold part based on a false acceptance rate (FAR) and a second threshold part based on a verification rate (VR).

15. The authentication method of claim 14, wherein the first threshold part is greater than the second threshold part.

16. The authentication method of claim 1, wherein the determining whether the first object is same as the second object in the registered image further includes:
determining whether the authenticating succeeds based on a final layer feature value of the input image and a final layer feature value of the registered image, the final layer feature value output by a final layer in the recognizer and the final layer feature value of the registered image corresponding to the final layer.

17. The authentication method of claim 1, further comprising:
applying the registered image to the recognizer; and
storing at least one feature value output by at least one intermediate layer and a final layer feature value output by a final layer of the plurality of layers as feature values of the registered image.

18. The authentication method of claim 17, further comprising:
receiving the registered image from a camera.

19. The authentication method of claim 1, wherein the first layer belongs to a plurality of intermediate layers among the plurality of layers.

20. The authentication method of claim 1, wherein the plurality of layers comprise at least one convolution layer and at least one pooling layer.

21. A training method comprising:
training a recognizer, the recognizer including a plurality of layers of a deep learning (DL) network;
determining a first threshold range for a first layer in the trained recognizer based on a desired performance index, the first threshold range being used for early authentication of an input image, the early authentication being a termination of an authentication method before reaching a final layer of the plurality of layers in the trained recognizer based on the first threshold range and authentication of the input image; and
determining a second threshold range for a second layer in the trained recognizer based on the desired performance index.

22. The training method of claim 21, further comprising:
applying validation data to the trained recognizer;
determining a first similarity between first feature values, the first feature values output by the first layer;
determining a second similarity between second feature values, the second feature values output by the second layer;
determining the first threshold range based on the first similarity; and
determining the second threshold range based on the second similarity.

23. The training method of claim 21, further comprising:
applying validation data to the trained recognizer;
determining a first distance between first feature values, the first feature values output by the first layer;
determining a second distance between second feature values, the second feature values output by the second layer;
determining the first threshold range based on the first distance; and
determining the second threshold range based on the second distance.

24. The training method of claim 21, wherein the first threshold range and the second threshold range are used to determine whether the input image is accepted or rejected.

25. The training method of claim 21, wherein the determining of the first threshold range comprises:
determining the first threshold range based on a similarity between a first feature value of first feature values and a second feature value of the second feature values.

26. The training method of claim 21, wherein the determining of the first threshold range comprises:
determining the first threshold range based on a distance between a first feature value of first feature values and a second feature value of the second feature values.

27. The training method of claim 21, wherein the training of the recognizer comprises:
training the recognizer based on an output of the first layer, an output of the second layer and a label value of a training sample, the output of the first layer being in response to an input of the training sample, the output of the second layer being in response to the input of the training sample.

28. The training method of claim 21, wherein the training of the recognizer comprises:
training the recognizer based on a first feature value output by a first network, a second feature value and a label of a training sample, the first network receives an output of the first layer, the second feature value output by a second network that receives an output of the second layer.

29. An authentication apparatus comprising:
at least one processor configured to execute computer-readable instructions to cause the authentication apparatus to,
output at least one feature value of a first object in an input image using a first layer among a plurality of layers of a deep learning (DL) network included in a recognizer, and
determine whether the first object is the same as a second object in a registered image by
determining a similarity or a distance between the at least one feature value of the input image output using the first layer and a feature value of the registered image corresponding to the first layer,
determining whether the determined similarity or distance is within a threshold range corresponding to the first layer of the layers in the recognizer, the threshold range corresponding to the first layer of the layers in the recognizer being different than a threshold range corresponding to a second layer of the layers in the recognizer, and
authenticating the input image based on whether the similarity or the distance is within the threshold range corresponding to the first layer of the layers in the recognizer.

30. The authentication apparatus of claim 29, wherein the at least one processor is further configured to execute the computer-readable instructions to cause the authentication apparatus to determine whether to accept the input image or reject the input image.

31. The authentication apparatus of claim 29, wherein the first layer belongs to a plurality of intermediate layers among the plurality of layers.

32. The authentication apparatus of claim 29, wherein the first layer belongs to a plurality of intermediate layers, and the at least one processor is further configured to execute the computer-readable instructions to cause the authentication apparatus to determine whether the authentication of the input image succeeds based on feature values of the input image and feature values of the registered image, the feature values of the input image output by intermediate layers, respectively, and the feature values of the registered image corresponding to the intermediate layers, respectively.

33. The authentication apparatus of claim 29, wherein the at least one processor is further configured to execute the computer-readable instructions to cause the authentication apparatus to,
determine the similarity between the at least one feature value of the input image and the at least one feature value of the registered image, and
perform the authentication based on the determined similarity.

34. The authentication apparatus of claim 29, wherein the at least one processor is further configured to execute the computer-readable instructions to cause the authentication apparatus to,
determine the distance between the at least one feature value of the input image and the at least one feature value of the registered image, and
perform the authentication based on the determined distance.

35. The authentication apparatus of claim 29, wherein the at least one processor is further configured to execute the computer-readable instructions to cause the authentication apparatus to apply the registered image to the recognizer and to store at least one intermediate feature value output by at least one intermediate layer and a final layer feature value output by a final layer as feature values of the registered image.

* * * * *